(12) United States Patent
Maeda

(10) Patent No.: US 10,380,465 B2
(45) Date of Patent: Aug. 13, 2019

(54) PRINTING APPARATUS, CONTROL METHOD OF PRINTING APPARATUS, AND STORAGE MEDIUM

(71) Applicant: CANON KABUSHIKI KAISHA, Tokyo (JP)

(72) Inventor: Yuuki Maeda, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/384,661

(22) Filed: Dec. 20, 2016

(65) Prior Publication Data

US 2017/0103289 A1    Apr. 13, 2017

Related U.S. Application Data

(63) Continuation of application No. 13/165,698, filed on Jun. 21, 2011, now Pat. No. 9,558,429.

(30) Foreign Application Priority Data

Jun. 29, 2010   (JP) .................. 2010-148202

(51) Int. Cl.
| | |
|---|---|
| *B41J 13/00* | (2006.01) |
| *B41J 3/60* | (2006.01) |
| *G06F 3/12* | (2006.01) |
| *H04N 1/00* | (2006.01) |
| *G06K 15/02* | (2006.01) |

(52) U.S. Cl.
CPC ............ *G06K 15/1857* (2013.01); *B41J 3/60* (2013.01); *B41J 13/0009* (2013.01); *G06F 3/124* (2013.01); *G06F 3/1215* (2013.01); *G06F 3/1252* (2013.01); *G06F 3/1275* (2013.01); *G06K 15/02* (2013.01); *G06K 15/021* (2013.01); *G06K 15/1822* (2013.01); *G06K 15/1856* (2013.01); *H04N 1/00204* (2013.01); *H04N 1/00344* (2013.01); *H04N 1/00575* (2013.01); *H04N 1/00612* (2013.01); *H04N 1/00649* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 5,095,342 A | * | 3/1992 | Farrell ................. | G03G 15/234 355/23 |
| 2010/0080574 A1 | * | 4/2010 | Torikoshi ............... | G03G 15/70 399/19 |
| 2011/0205557 A1 | * | 8/2011 | Cook .................... | G03G 15/234 358/1.2 |
| 2011/0318043 A1 | * | 12/2011 | Maeda ....................... | B41J 3/60 399/82 |
| 2015/0363677 A1 | * | 12/2015 | Nihei ................. | G03G 15/0131 358/1.12 |

FOREIGN PATENT DOCUMENTS

JP    2004-145218 A    5/2004

* cited by examiner

*Primary Examiner* — David M. Gray
*Assistant Examiner* — Michael A Harrison
(74) *Attorney, Agent, or Firm* — Canon U.S.A., Inc. IP Division

(57) ABSTRACT

When a job for executing both of a one-sided printing and a two-sided printing, the lowering of the productivity is suppressed and an output result a user desires is output.

7 Claims, 14 Drawing Sheets

IMAGE DATA

OUTPUT RESULT
DISCHARGING ORDER →

FIG.5A
IMAGE DATA
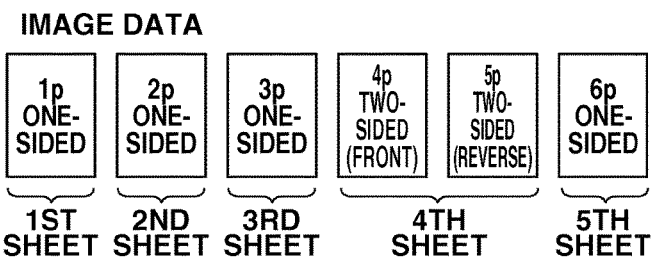
| 1p ONE-SIDED | 2p ONE-SIDED | 3p ONE-SIDED | 4p TWO-SIDED (FRONT) | 5p TWO-SIDED (REVERSE) | 6p ONE-SIDED |
1ST SHEET | 2ND SHEET | 3RD SHEET | 4TH SHEET | 5TH SHEET
FIG.5B
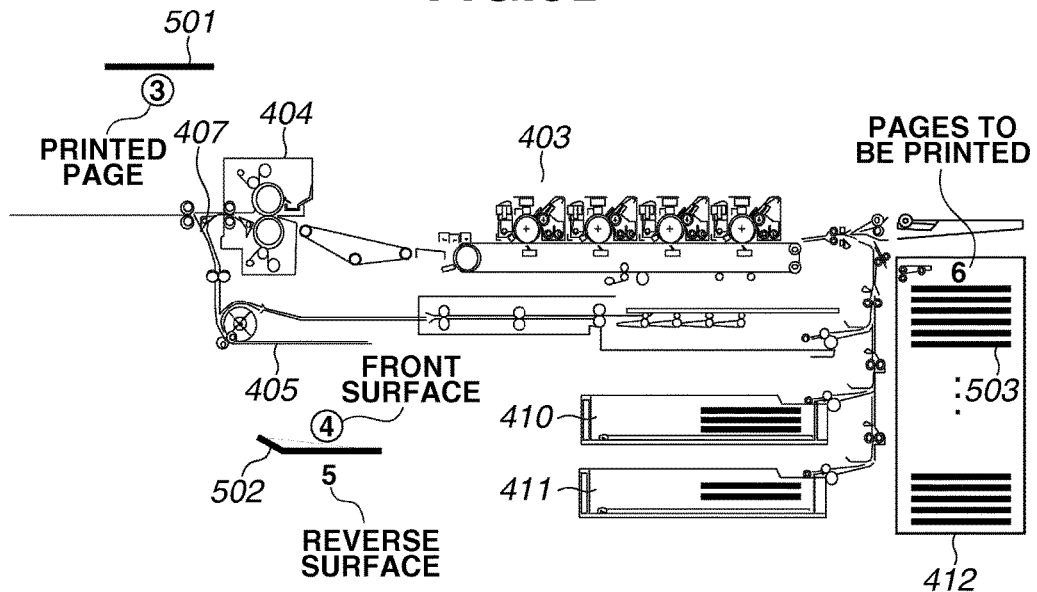
FIG.5C
OUTPUT RESULT
DISCHARGING ORDER →
| 1ST SHEET ONE-SIDED | 2ND SHEET ONE-SIDED | 3RD SHEET ONE-SIDED | 4TH SHEET TWO-SIDED | 5TH SHEET ONE-SIDED |

FIG.6A
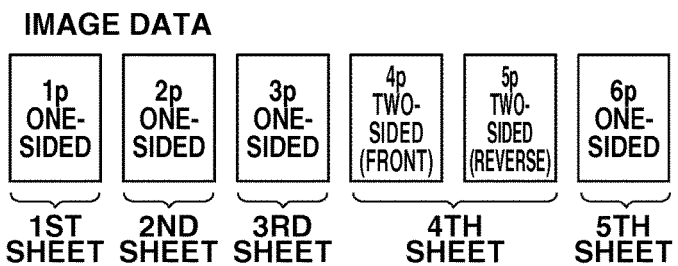
FIG.6B
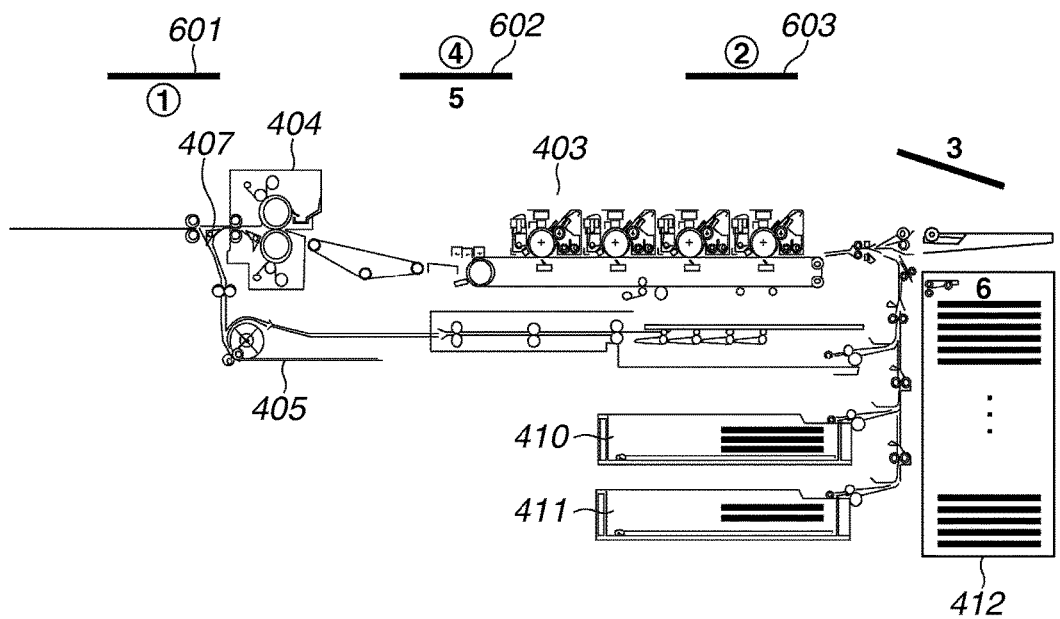
FIG.6C

IMAGE DATA

OUTPUT RESULT

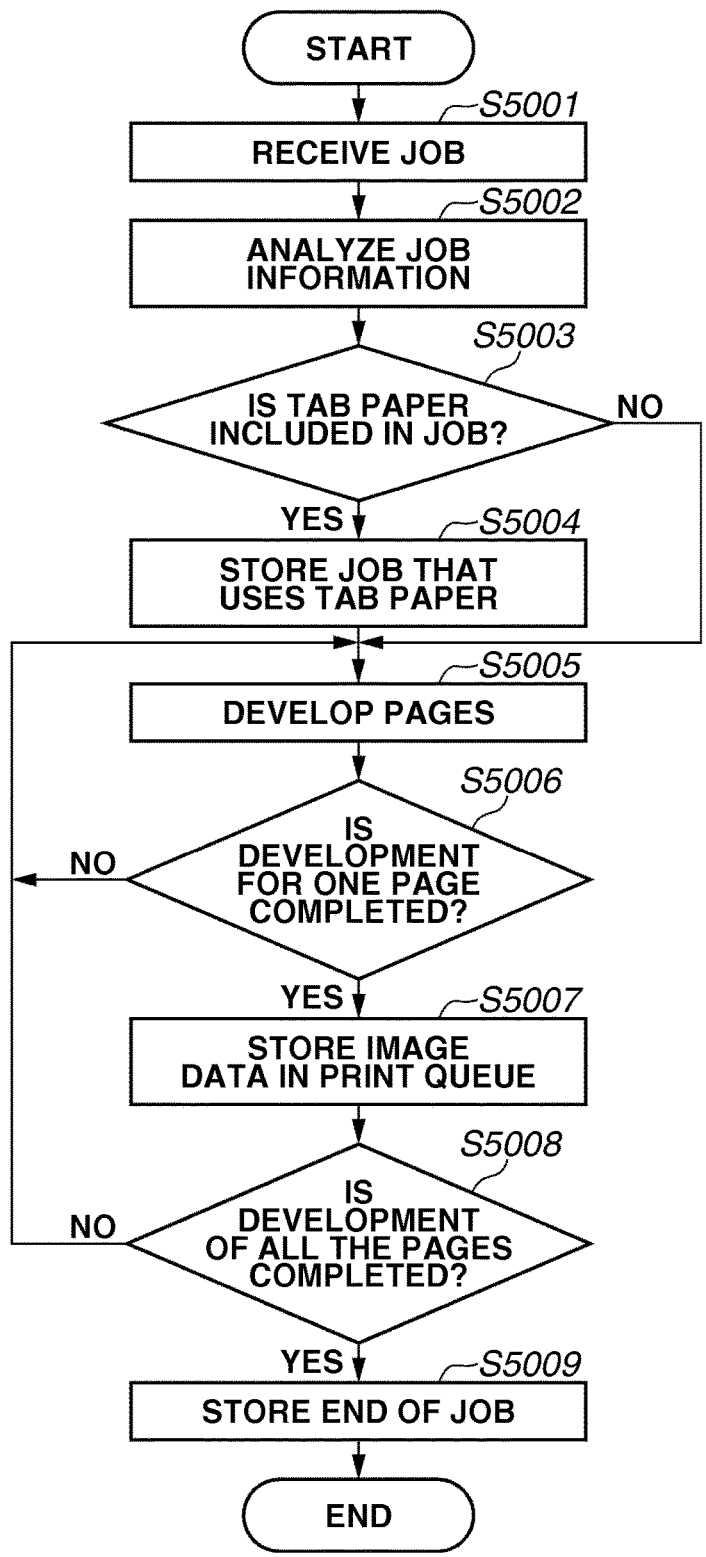

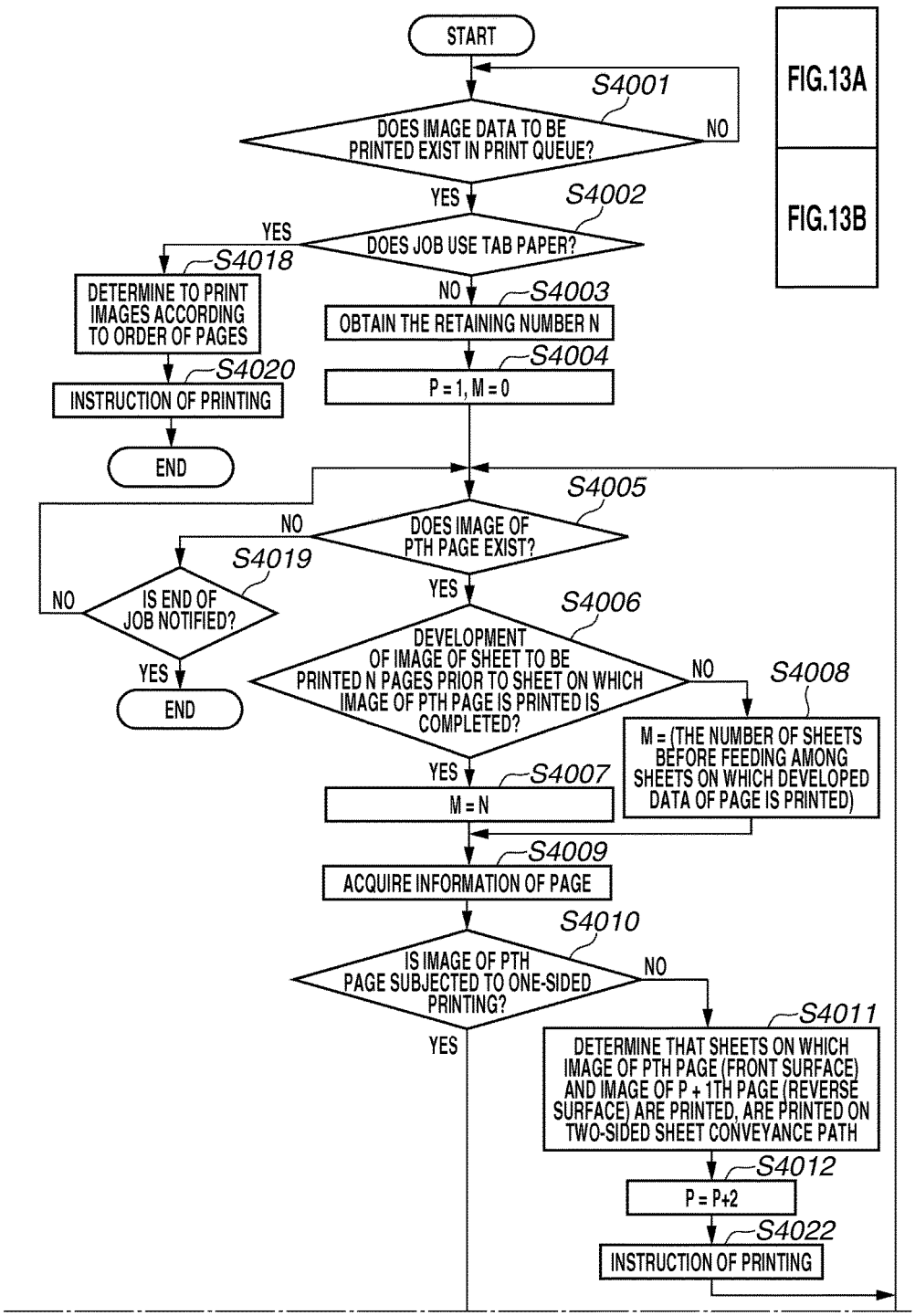
FIG. 13A
FIG. 13
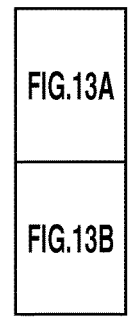

ately in the images of the pages to be subjected

PRINTING APPARATUS, CONTROL METHOD OF PRINTING APPARATUS, AND STORAGE MEDIUM

This application is a Continuation of U.S. patent application Ser. No. 13/165,698 filed Jun. 21, 2011 which claims the benefit of Japanese Patent Application No. 2010-148202 filed Jun. 29, 2010. U.S. patent application Ser. No. 13/165,698 and Japanese Patent Application No. 2010-148202 are hereby incorporated by reference herein in their entirety.

BACKGROUND OF THE INVENTION

Field of the Invention

The present invention relates to a printing apparatus, a control method of the printing apparatus, and a storage medium.

Description of the Related Art

The conventional printing apparatus includes a two-sided conveyance path and executes one-sided printing or two-sided printing. The one-sided printing is a printing method performed by the printing apparatus in which an image is printed on a front surface of a fed sheet and thus printed sheet is discharged. The two-sided printing is a printing method in which an image is printed on a front surface of a fed sheet and subsequently the sheet is conveyed through a two-sided conveyance path, another image is printed on a reverse surface of the sheet, and finally discharged.

The conventional printing apparatus receives a job for executing both of the one-sided printing and the two-sided printing to execute the job, thereby executing the one-sided printing on the sheet to be subjected to the one-sided printing or executing the two-sided printing on the sheet to be subjected to the two-sided printing.

In the above described printing apparatus, in a case where image data contained in the job is printed from a first page in the right order, the sheet to be subjected to the next one-sided printing is not fed until the sheet to be subjected to the two-sided printing passes through the two-sided conveyance path so as not to disorder the pages of the output result. Therefore, a wide distance appears between the sheet to be subjected to the two-sided printing and the sheet to be subjected to the one-sided printing. The wide distance increases a time required for printing pages for the job.

Japanese Patent Laid-open Publication No. 08-262814 discusses a printing apparatus that prevents the wide distance from appearing between the sheets by conveying the sheets through the two-sided conveyance path even in a case of the sheets to be subjected to the one-sided printing in a similar manner as a case of the sheets to be subjected to the two-sided printing.

Japanese Patent Laid-open Publication No. 2010-76418 discusses a method for printing an image on a front surface of a sheet to be subjected to the two-sided printing prior to printing of an image on a sheet to be subjected to the one-sided printing and to be fed before the sheet to be subjected to the two-sided printing. According to Japanese Patent Laid-open Publication No. 2010-76418, a distance between the sheet conveyed through the two-sided conveyance path in order to print the image on the reverse surface and the sheet to be subjected to the one-sided printing can be narrowed in printing. By narrowing the distance between the sheets, a time required for printing for the job can be reduced.

However, in a method of Japanese Patent Laid-open Publication No. 08-262814, in a case of a job that must execute both of the one-sided printing and the two-sided printing, since the sheet is conveyed through the two-sided conveyance path even if the sheet is the one to be subjected to the one-sided printing, it takes more time in comparison with a case where the sheet to be subjected to the one-sided printing is discharged without being conveyed through the two-sided conveyance path. More specifically, in a case where there are a large number of sheets to be subjected to the one-sided printing in the sheets to be printed by the job, the productivity is remarkably lowered.

On the other hand, in the method of Japanese Patent Laid-open Publication No. 2010-76418, the printing can be executed while the lowering of the productivity can be suppressed. However, in a case where the job is executed that uses a plurality of sheets having a predetermined order such as sheets of tabbed paper and pre-numbered sheets, there is a case that the output products cannot follow an original order.

SUMMARY OF THE INVENTION

According to an aspect of the present invention, a printing apparatus includes a receiving unit configured to receive a job for executing both of one-sided printing and two-sided printing, a specifying unit configured to specify a page to be subjected to the one-sided printing and pages to be subjected to the two-sided printing included in the job received by the receiving unit, and a printing control unit configured to perform control such that the page to be subjected to the one-sided printing specified by the specifying unit are subjected to the one-sided printing and the pages to be subjected to the two-sided printing specified by the specifying unit are subjected to the two-sided printing, wherein the printing control unit prints, prior to an image of the page to be subjected to the one-sided printing, an image of a first surface contained in the images of the pages to be subjected to the two-sided printing following the pages to be subjected to the one-sided printing and executes a printing control for printing the image of the page to be subjected to the one-sided printing between the printings of the image of the first surface and the image of a second surface contained in the images to be subjected to the two-sided printing, and wherein the printing control unit performs control, in a case where a plurality of sheets having a predetermined order are to be used for the job, so as not to execute the printing control.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 5A, 5B, and 5C, respectively, illustrate a sheet conveyance method in a combination of a one-sided sheet conveyance method and a two-sided sheet conveyance method according to the first exemplary embodiment.

FIGS. 6A, 6B, and 6C, respectively, illustrate the sheet conveyance method in the combination of the one-sided sheet conveyance method and the two-sided sheet conveyance method according to the first exemplary embodiment.

FIG. 12 is a flowchart illustrating the flow of the processing according to the third exemplary embodiment.

FIGS. 13A-B are a flow chart illustrating the flow of the processing according to the third exemplary embodiment.

DESCRIPTION OF THE EMBODIMENTS

Various exemplary embodiments, features, and aspects of the invention will be described in detail below with reference to the drawings.

Figure 1:
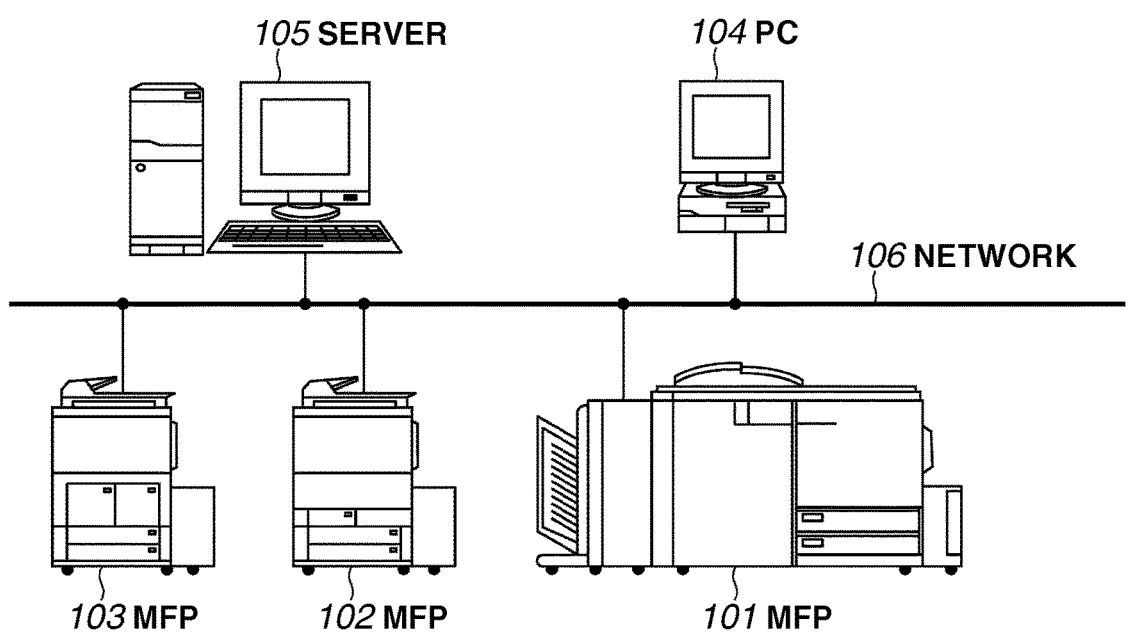
FIG. 1 illustrates a printing system according to a first exemplary embodiment.

FIG. 1 illustrates a configuration of a printing system according to a first exemplary embodiment.

The printing system includes a Multi Function Peripheral (MFP) 101, a MFP 102, a MFP 103, a personal computer (PC) 104, and PC 105, which are connected to each other via a network 106. The MFP is an abbreviation of the Multi Function Peripheral.

The MFP 101 receives print data from the client PC 104 via the network 106 and has a printing function for performing printing according to the received print data. The MFP 101 has a copying function for generating image data of a document read out by a scanner and printing the image according to the generated image data. In addition to the above functions, the MFP 101 may have a facsimile function and/or a network scanner function. The MFP 101 is a color printer for performing color printing, whereas, the MFP 102 and the MFP 103 are a black and white printer for performing monochromatic printing.

The PC 104 is a client PC. The PC 104 creates an image according to an operation of a user by using an application. The PC 104 generates print data based on thus created image via a printer driver and transmits the generated print data to any one of the MFPs 101 through 103.

A server 105 monitors the MFPs 101 through 103, respectively, connected to the network 106. Further, the server 105 instructs pausing of the print job input into each of the MFPs 101 through 103, change of a setting of the print job, and a restarting of the print job according to an instruction from the user.

In the present exemplary embodiment, a case where the following control is performed by the MFP 101 is exemplified for the sake of an explanation. However, the present invention is not limited to the above but may be also applied to the MFP 102 or the MFP 103.

Figure 2:
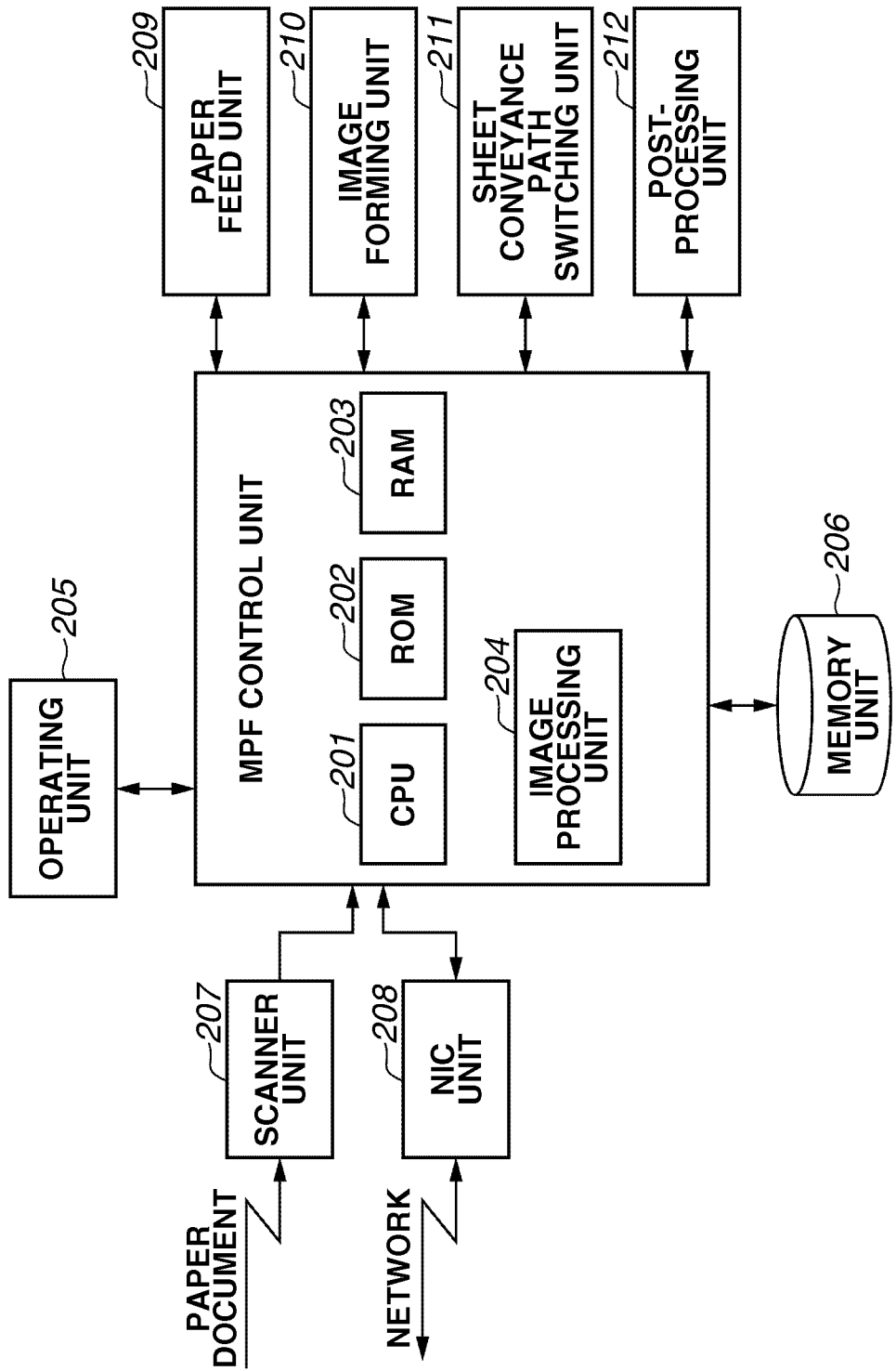
FIG. 2 is a block diagram illustrating a configuration of a multifunction peripheral (MFP) according to the first exemplary embodiment.

Now, a configuration of the MFP 101 is described below with reference to FIG. 2.

The MFP 101 includes a central processing unit (CPU) 201, a read only memory (ROM) 202, a random access memory (RAM) 203, an image processing unit 204, an operating unit 205, a memory unit 206, a scanner unit 207, a Network Interface Card (NIC) unit 208, a paper feed unit 209, an image forming unit 210, a sheet conveyance path switching unit 211, and a post-processing unit 212. The above components are connected to each other via a bus (not illustrated) so as to be able to transmit various types of data to each other.

The CPU 201 totally controls the MFP 101. For example, the CPU 201 controls image processing by using the image processing unit 204 and controls printing by using the image forming unit 210 and the conveyance path switching unit 211. The ROM 202 stores a program that is read out by the CPU 201. The RAM 203 functions as a work memory of the CPU 201. The image processing unit 204 develops print data to generate an image data according to the instruction from the CPU 201. An example of the print data includes Page Description Language (PDL) data.

The operating unit 205 receives an operation from a user. The operating unit 205 includes a display unit that notifies a state of the MFP 101 and an error.

The memory unit 206 includes, for example, a hard disk drive (HDD) and stores print data and image data developed by the image processing unit 204.

The scanner unit 207 reads a document and generates image data based on an image of the readout document to transmit it to an MFP control unit.

The NIC unit 208 connected to the network transmits the print data received from the PC 104 or the server 105 to the MFP control unit.

The paper feed unit 209 includes a sheet cassette and a paper feed deck. Each of the sheet cassette and the paper feed deck stores a plurality of sheets for printing. Examples of the sheet include a plain paper and a tabbed paper (e.g., an Index paper). The tabbed paper has a tab and is used in, for example, providing a heading to make one set including a plurality of sheets. The MFP 101 includes a plurality of paper feed units 209. In a case where sheets of plain paper are set in a certain paper feed unit 209, the user sets that the sheets of plain paper are set in the paper feed unit 209 by using the operating unit 205. In a case where the user sets the sheets of tabbed paper in the paper feed unit 209, the user sets that the sheets of tabbed paper are set in the paper feed unit 209 by using the operating unit 205.

The image forming unit 210 forms an image on a sheet fed from the paper feed unit 209 according to the image data received from the MFP control unit.

The conveyance path switching unit 211 switches a conveyance path between a case where the one-sided printing is performed on the sheet and a case where the two-sided printing is performed on the sheet.

The post-processing unit 212 executes post-processing, as required, on the sheet on which the image is formed by the image forming unit 210. Examples of the post-processing include a stapling process, a punching process, and a sorting process.

Figure 3:
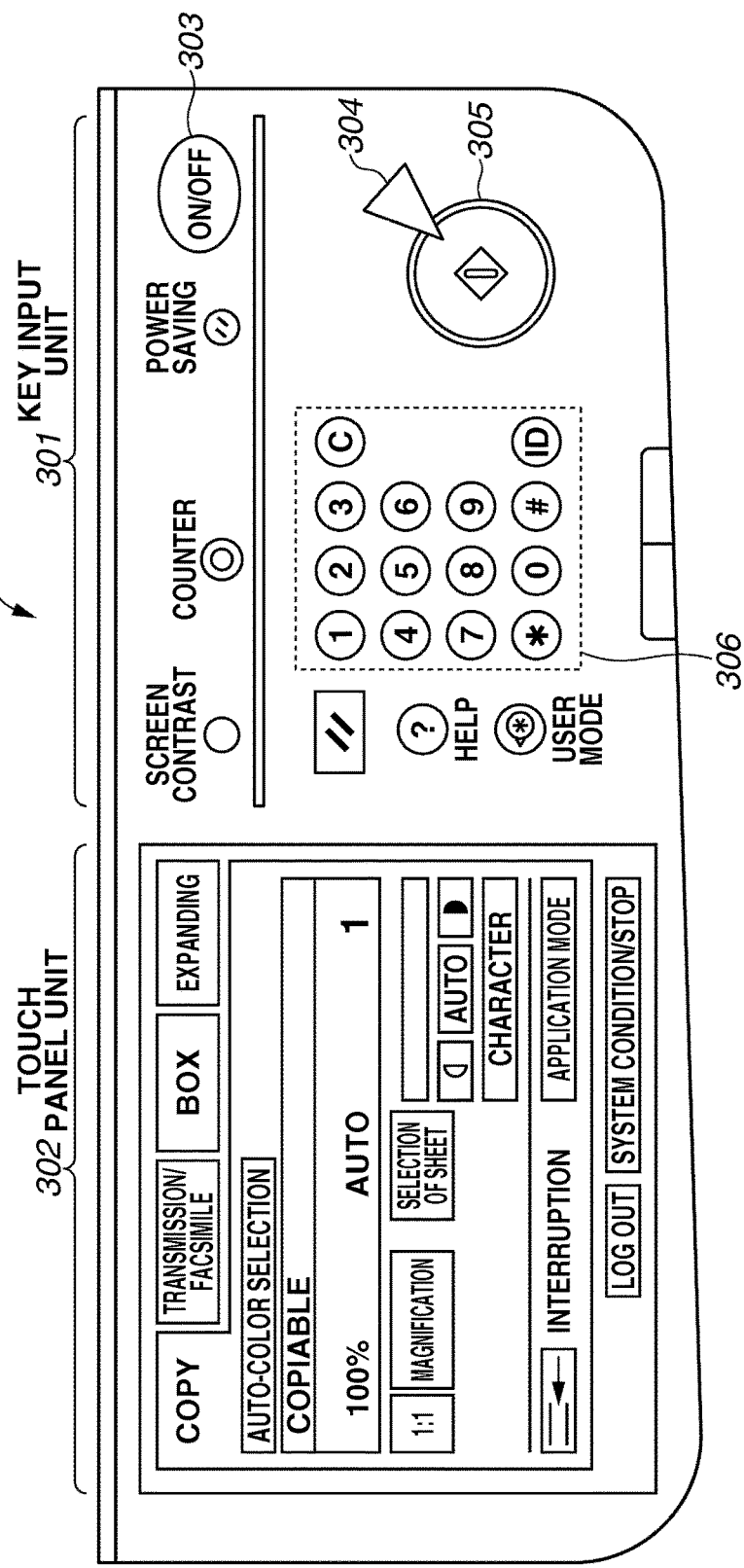
FIG. 3 illustrates a configuration of an operating unit according to the first exemplary embodiment.

The operating unit 205, illustrated in FIG. 2, included in the MFP 101 is described with reference to FIG. 3.

The operating unit 205 includes a key input unit 301 for receiving a user operation through hard keys and a touch panel unit 302 capable of displaying soft keys (i.e., display keys) through which the user operation is received.

The key input unit 301 is described below. As illustrated in FIG. 3, the key input unit 301 includes an operating unit power switch 303. If the user presses the operating unit power switch 303 when the MFP 101 is in a standby mode (i.e., in a normal operation state), the CPU 201 switches the MFP 101 from the standby mode to a sleep mode (i.e., a state of saving a power consumption). On the other hand, if the user presses the operating unit power switch 303 while the MFP 101 is in the sleep mode, the CPU 201 switches the MFP 101 from the sleep mode to the standby mode.

A start key 305 receives an instruction for causing the MFP 101 to execute a copying operation and a transmission operation of data.

A stop key 304 receives from the user an instruction for pausing processing of the received job. A numeric keypad 306 causes the user to execute the various kinds of numerical settings.

A touch panel unit 302 is described below. The touch panel unit 302 includes a Liquid Crystal Display (LCD) unit and a touch panel display including a transparent electrode attached thereon.

The touch panel unit 302 has a function for receiving various kinds of settings from an operator and a function for providing information to the operator.

Figure 4:
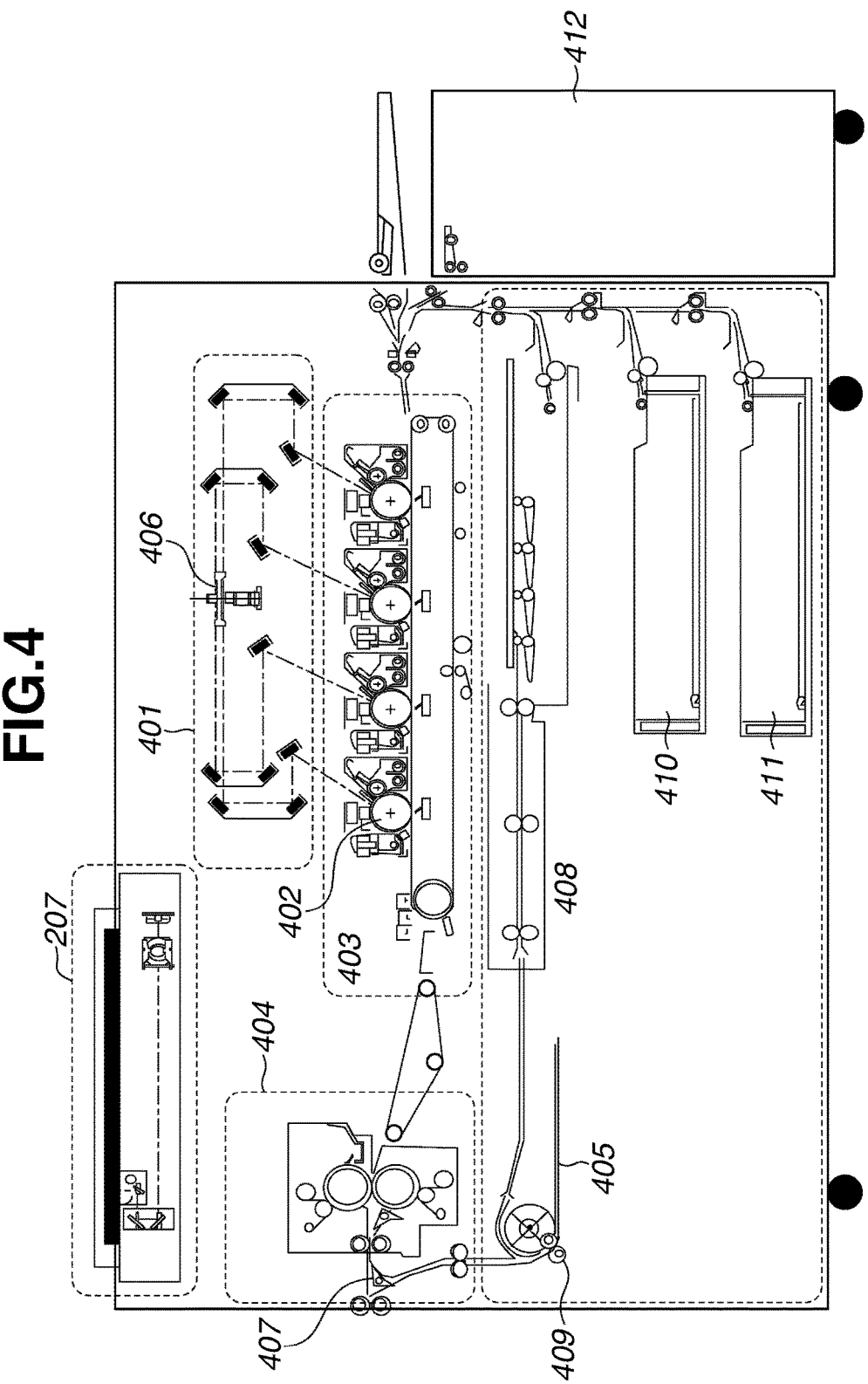
FIG. 4 is a cross sectional view illustrating a configuration of the MFP according to the first exemplary embodiment.

FIG. 4 is a cross sectional view illustrating a configuration of the MFP 101. The MFP 101 includes four drums for each color as illustrated in FIG. 4 to print a color image.

The MFP 101 includes the scanner unit 207, a laser exposure unit 401, a rotational polygon mirror (e.g., a polygon mirror) 406, photosensitive drums 402, an image forming unit 403, a fixing unit 404, a flapper 407, a two-sided conveyance path 408, a paper feed unit A 410, and a paper feed unit B 411. Optionally, the MFP 101 can be connected to a paper feed unit C 412.

The scanner unit 207 sheds light on the document placed on a platen, thereby optically reading an image of the document. Thereafter, the scanner unit 207 converts the image into an electric signal to form image data.

The laser exposure unit 401 irradiates with light such as laser light modulated according to the image data which enters a rotational polygon mirror (i.e., a polygon mirror) 406, that rotates at a constant angular velocity and emits the modulated light onto the photosensitive drums 402 as reflected scanning light.

The image forming unit 403 rotatably drives the photosensitive drums 402 to charge them with charging devices. The image forming unit 403 develops latent images formed on the photosensitive drums 402 with the laser exposure unit 401 by using toners. Then, the image forming unit 403 achieves a series of an electrophotographic process including a transfer of the toner images onto a sheet and a collection of minute amount of toner that was not transferred onto the sheet but remains on the photosensitive drums 402, by using four developing units (i.e., four developing stations) which are mounted on the image forming unit. The four developing units of the colors of cyan (C), magenta (M), yellow (Y), and black (K) positioned in this order sequentially execute image forming operations of a magenta image, a yellow image, and a black image after a passage of a predetermined time from a time the cyan station starts to form a cyan image. With the above described timing control, a full-color toner image is transferred onto the sheet without a color misregistration.

The fixing unit 404 includes a combination of rollers, a belt, and a built-in heat source such as a halogen heater. The fixing unit 404 fuses and fixes by heat and pressure the toner on the sheet onto which the toner image has been transferred by the image forming unit 403.

Each of the paper feed unit A 410, the paper feed unit B 411, and the paper feed unit C 412 stores sheets for printing. The MFP 101 causes one of the paper feed unit A 410, the paper feed unit B 411, and the paper feed unit C 412 to feed sheets and transfers the image formed by the image forming unit 403 to thus fed sheet. The MFP 101 causes the fixing unit 404 to fix the transferred image to the sheet. In a case where the sheet is discharged with a surface on which the image is formed facing down (i.e., in a case of performing a face down discharge), the MFP 101 guides the sheet by using a flapper 407 to the reversing path 405 to discharge the reversed sheet through a discharge port. On the other hand, in a case where the sheet is discharged with a surface on which the image is formed facing up (i.e., in a case of performing a face up discharge), the sheet is discharged through the discharge port without guiding the sheet to the reversing path 405 by using the flapper 407.

In a case where images are printed on both of the surfaces of the sheet, the sheet is guided to the reversing path 405 by using the flapper 407 and a trailing edge of the sheet is pinched by the roller pair 409. Thereafter, the sheet is guided to the two-sided conveyance path 408. The sheet guided to the two-sided conveyance path 408 is again conveyed to the image forming unit 403 where the image is printed on a reverse surface of the sheet.

Also, in a case where the sheet to be subjected to the one-sided printing is conveyed to the two-sided path, the sheet is guided to the reversing path 405 by using the flapper 407 after the image is fixed to the sheet and a trailing edge of the sheet is pinched by the roller pair 409. Thereafter, the sheet is guided to the two-sided conveyance path 408. In this case, even if the sheet guided to the two-sided conveyance path 408 is conveyed again to the image forming unit 403, an image is not printed on the reverse surface of the sheet by the image forming unit 403.

As described above, the MFP 101 prints the image on the sheet.

The MFP 101 as described above receives a job that must execute both of the one-sided printing and the two-sided printing from the PC 104, stores the received job in the memory unit 206, and executes the stored job. The MFP 101 can receive a plurality of jobs and store them in the memory unit 206. In a case where the plurality of jobs is stored in the memory unit 206, the CPU 201 of the MFP 101 executes the plurality of jobs stored in the memory unit 206 in the order it was received.

The job that must execute both of the one-sided printing and the two-sided printing is generated by, for example, the PC 104. More specifically, such a job is generated by the following method.

Firstly, a method in which the PC 104 generates the job by using the printer driver is described below. For example, the user generates a plurality of pages of image data by using an application of the PC 104. After the user designates the MFP 101 via the printer driver, the user selects the one-sided printing and further selects the two-sided printing with respect to a portion of the plurality of pages of image data. When the user presses a print instruction button of the printer driver, the PC 104 generates print data (i.e., PDL data) based on the image data. The PC 104 generates a job including a print setting received from the user and the generated print data. The print settings include a setting of a size or a sort of the sheets to be used, a setting whether to use the sheets of tabbed paper, and settings which pages are to be subjected to the two-sided printing and which pages are to be subjected to the one-sided printing. The PC 104 transmits the generated job to the MFP 101. When the MFP 101 receives the job, the MFP 101 subjects the designated portion of the pages to the two-side printing and subjects the other pages to the one-sided printing.

For example, the user uses the application of the PC 104 to generate image data for 10 pages. The user designates such that 1 through 4 pages of the image data are subjected to the one-sided printing, 5 and 6 pages of the image data are subjected to the two-sided printing, and 7 through 10 pages of the image data are subjected to the one-sided printing among 10 pages of the image data. Then, the user presses the print instruction button. Thereby, the PC 104 transmits a job for subjecting 1 through 4 pages of the image data to the one-sided printing, subjecting 5 and 6 pages of the image data to the two-sided printing, and subjecting 7 through 10 pages of the image data to the one-sided printing to the MFP 101. The MFP 101 after receiving the job subjects 1 through 4 pages of the image data to the one-sided printing, 5 and 6 pages of the image data to the two-sided printing, and 7 through 10 pages of the image data to the one-sided printing, respectively, according to the settings of the job. The MFP 101 receives such settings from the operating unit 205, so that, in a case where the MFP 101 executes a copying job for printing the data received from the scanner unit 207 by the image forming unit 210, the MFP 101 can perform the printing of the job with the same printing method.

Secondary, a method in which the PC 104 generates the job by using the application is described below. For example, the user generates image data designating whether the page is to be subjected to the one-sided printing, whether the page is to be subjected to a front surface printing of the two-sided printing, or whether the page is to be subjected to a reverse surface printing of the two-sided printing for each page by using the application of the PC 104. When the user generates such image data, makes print settings as to the size or the sort of the sheets to be used and whether to use the sheets of tabbed paper by the printer driver, and instructs printing of the image data, the MFP 101 generates a job in a manner similar to the first method to transmit it to the MFP 101. The MFP 101 analyzes the received job and executes the one-sided printing or the two-sided printing on the sheet according to the print settings and a setting of the image data for each page.

A method for conveying the sheets when the MFP 101 receives and executes the job that must execute both of the one-sided printing and the two-sided printing is described below with reference to FIGS. 5, 6, 7, and 8.

Initially, a method for conveying the sheets in a case where the image data included in the received job is printed from the first page in the right order is described below with reference to FIG. 5.

In the present exemplary embodiment, as illustrated in FIG. 5A, a case of receiving the job for printing the 6$^{th}$ page of the image data, subjecting the images of the 4$^{th}$ and 5$^{th}$ pages to the two-sided printing on the plain paper, and subjecting the other pages to the one-sided printing on the plain paper is explained below. In the present exemplary embodiment, the printed sheet is reversed through the reversing path 405 to be discharged, thereby executing the face down discharge, i.e., discharging the sheet with a surface of the sheet on which an image is formed facing down.

FIG. 5B is an enlarged view of the paper feed unit and a sheet conveyance path of the MFP 101. Each of schematically illustrated sheets 501 and 502 is conveyed in parallel along the sheet conveyance path. After the 3$^{rd}$ sheet 501 is reversed through the reversing path 405, the sheet 501 is conveyed to the discharge port. After the 4$^{th}$ sheet 502 is conveyed to the reversing path 405, the 4$^{th}$ sheet 502 is reversed and conveyed to the two-sided conveyance path 408. A circled 3 illustrated below the 3$^{rd}$ sheet 501 represents that printing of the image of the 3$^{rd}$ page is completed. A circled 4 illustrated above the 4$^{th}$ sheet 502 represents that printing of the image of the 4$^{th}$ page is completed. A numerical number 5 illustrated below the 4$^{th}$ sheet 502 represents that printing of the image of the 5$^{th}$ page is not completed. As it is illustrated in FIG. 5B, the pages having been printed are represented with circled numbers, whereas the pages to be printed are represented with numbers without circle.

FIG. 5B illustrates a state in which, after the 1$^{st}$ and the 2$^{nd}$ sheets are discharged, the image of the 3$^{rd}$ page is printed on a front surface of the 3$^{rd}$ sheet 501 and the 3$^{rd}$ sheet is reversed through the reversing path 405 to be discharged. After the image of the 4$^{th}$ page is formed on a front surface (i.e., a first surface) of the 4$^{th}$ sheet 502, the sheet 502 is reversed by the reversing path 405 to be conveyed to the two-sided conveyance path 408.

At the time, the CPU 201 does not feed the 5$^{th}$ sheet 503 onto which an image of the 6$^{th}$ page is to be formed until the 4$^{th}$ sheet 502 on which the images of the 4$^{th}$ page and the 5$^{th}$ page are formed returns to the image forming unit 403 again through the two-sided conveyance path 408. Then, the CPU 201 feeds the 5$^{th}$ sheet 503 on which the image of the 6$^{th}$ page is to be formed after the 4$^{th}$ sheet 502 on which the images of the 4$^{th}$ page and the 5$^{th}$ page are formed returns to the image forming unit 403 again through the two-sided conveyance path 408, resulting in printing the 5$^{th}$ sheet 503. The CPU 201 prints the image of the 5$^{th}$ page on a reverse surface (i.e., a second surface) of the 4$^{th}$ sheet 502 and further prints the image of the 6$^{th}$ page on the 5$^{th}$ sheet 503. According to the above described control, the sheets to be discharged after printing are in the right order from the 1$^{st}$ sheet through the 6$^{th}$ sheet and the pages to be printed on the sheets and discharged are in the right order as it is illustrated in FIG. 5C.

However, in this case, a distance between the 3$^{rd}$ sheet 501 on which the image of the 3$^{rd}$ page is formed and the 4$^{th}$ sheet 502 on which the images of the 4$^{th}$ page and the 5$^{th}$ page are formed becomes wider.

Now, a method for performing printing of the front surfaces of the sheets to be subjected to the two-sided printing prior to printing of the sheets to be primary fed and subjected to the one-sided printing is described below with reference to FIG. 6.

MFP 101 prints the image of the surface of the sheet to be subjected to the two-sided printing prior to the following image of the sheet to be subjected to the one-sided printing. Then, the image of the sheet to be subjected to the one-sided printing and the image of the reverse surface of the sheet to be subjected to the two-sided printing are subsequently printed in this order, i.e., are printed in a two-sided printing passing mode.

FIG. 6 illustrates a sheet conveyance method of the MFP 101 in the two-sided printing passing mode. In this example, a case where image data illustrated in FIG. 6A is printed, similar to FIG. 5, is described below.

In the present exemplary embodiment, the number of sheets retainable in the two-sided conveyance path 408 is 2. In an example illustrated in FIG. 6B, the 1$^{st}$ sheet 601 on which an image of the 1$^{st}$ page is formed is discharged after reversing through the reversing path 405. In a case of a method illustrated in FIG. 5, the CPU 201 prints an image of the 4$^{th}$ page that is to be printed on the 4$^{th}$ sheet on the 2$^{nd}$ sheet. The reason why the image is printed on the sheet prior thereto by two sheets is that the number of sheets retained in the two-sided conveyance path 408 is 2. In a case where the number of sheets retained is 2, after a sheet 602 of which front surface is to be subjected to the two-sided printing and provided with an image formed thereon passes through the two-sided conveyance path 408, the pages of the output products are output in the right order when the sheet is returned to the image forming unit 403 again in order to form the image on the reverse surface of the sheet 602.

The CPU 201 conveys the $2^{nd}$ sheet 602 on which the image of the $4^{th}$ page is formed, to the two-sided conveyance path 408. Subsequently, the CPU 201 forms the image of the $2^{nd}$ page on the $3^{rd}$ sheet 603 and feeds the $4^{th}$ sheet 604 on which the image of the $3^{rd}$ page is to be formed.

After forming the image of the $3^{rd}$ page on the $4^{th}$ sheet 604, the CPU 201 conveys the $2^{nd}$ sheet 602 having been conveyed to the two-sided conveyance path, to the image forming unit 403 and prints the image of the $5^{th}$ page on a reverse surface of the $2^{nd}$ sheet 602. The CPU 201 records the reverse surface of the $2^{nd}$ sheet as well as feeds the $5^{th}$ sheet from the paper feed unit. The CPU 201 discharges the $5^{th}$ sheet after forming the image thereon. As a result thereof, an order of images to be printed on the sheets by the image forming unit 403 differs from that illustrated in FIG. 5. However, the sheets to be discharged are discharged in the right order as illustrated in FIG. 6C.

By conveying the sheets in the above described manner, the distance between the sheets can be narrowed in comparison with the conveyance method illustrated in FIG. 5. By narrowing the distance between the sheets, a time required for printing for the job can be reduced.

However, in a case where the job for performing the printing on the plurality of sheets having a predetermined order (i.e., the ordered sheets) such as the sheets of tabbed paper and the pre-numbered sheets, if the two-sided printing passing mode is applied, the output result is in disorder. More specifically, an order of tabs of the sheets of tabbed paper to be output and an order of the page numbers comes to be in disorder.

Figure 7A:
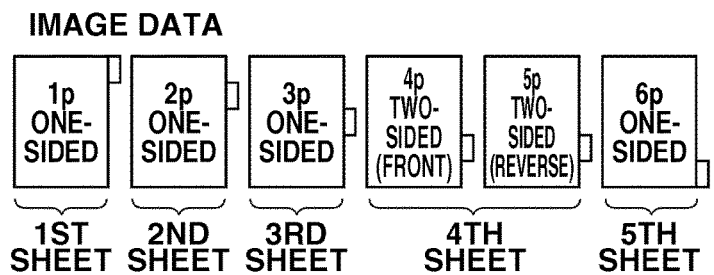
FIGS. 7A, 7B, and 7C, respectively, illustrate a state that a tabbed paper passes a precedent tabbed paper according to the first exemplary embodiment.
Figure 7B:
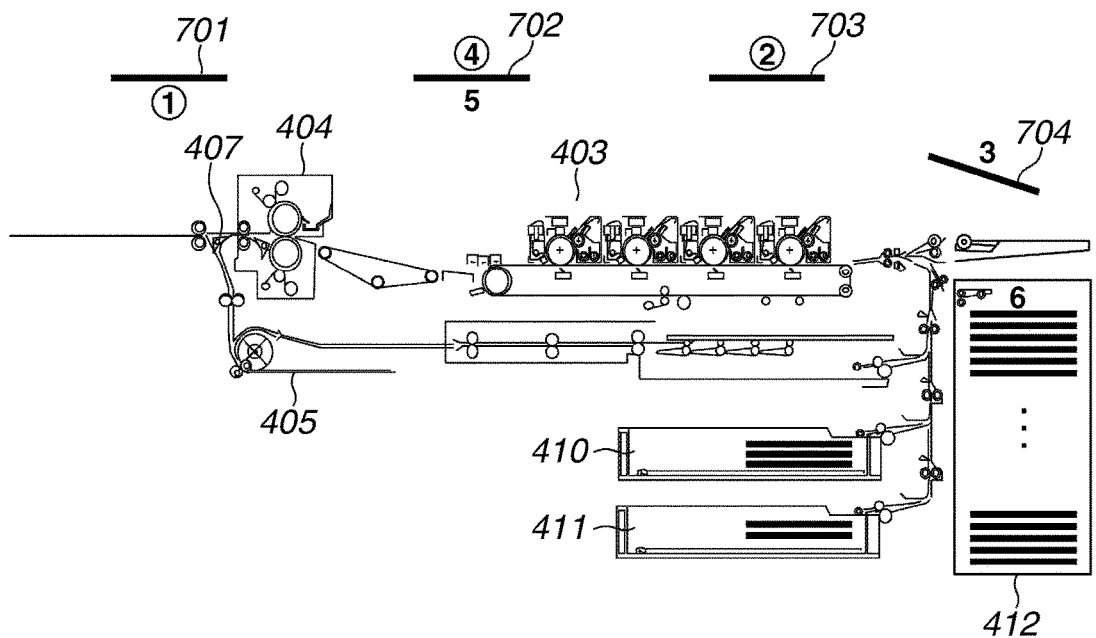

The above state is described below with reference to FIG. 7. FIG. 7 illustrates that the job for printing the image on the sheets of tabbed paper is received and executed. As illustrated in FIG. 7A, in the image data, the image of the $1^{st}$ page is the image for the $1^{st}$ tabbed paper, the image of the $2^{nd}$ page is the image for the $2^{nd}$ tabbed paper, and the image of the $3^{rd}$ page is the image for the $3^{rd}$ tabbed paper, respectively. Further, the image of the $4^{th}$ page is the image for a front surface of the $4^{th}$ tabbed paper, the image of the $5^{th}$ page is the image for a reverse surface of the $5^{th}$ tabbed paper, and the image of the $6^{th}$ page is the image for the $5^{th}$ tabbed paper, respectively.

A set of five sheets of tabbed paper are used in a printing method of FIG. 7.

When the printing is executed in the two-sided printing passing mode illustrated in FIG. 6 by using the above described sheets of tabbed paper, the CPU 201 prints the image of the $1^{st}$ page on the $1^{st}$ tabbed paper 701 and thereafter reverses the $1^{st}$ tabbed paper 701 through the reversing path 405 to discharge it. Since the CPU 201 feeds the $2^{nd}$ tabbed paper 702 and the two-sided printing passing mode is set, the CPU 201 acquires the number of sheets retainable in the two-sided conveyance path 408 of the MFP 101. Since the number of sheets retainable in the two-sided conveyance path 408 of the MFP 101 is 2, the CPU 201 prints the image of the $4^{th}$ page that is the front surface page for the two-sided printing on the $2^{nd}$ tabbed paper 702. After reversing the $2^{nd}$ tabbed paper 702 through the reversing path 405, the CPU 201 conveys the tabbed paper 702 to the two-sided conveyance path 408. Following the printing on a front surface of the $2^{nd}$ tabbed paper 702, the CPU 201 prints the image of the $2^{nd}$ page on the $3^{rd}$ tabbed paper 703 and prints the image of $3^{rd}$ page on the $4^{th}$ tabbed paper 704, respectively, by the image forming unit 403. Subsequently, the CPU 201 returns the $2^{nd}$ tabbed paper 702 having been conveyed to the two-sided conveyance path 408 to the image forming unit 403 and prints the image of the $5^{th}$ page on a reverse surface of the tabbed paper 702. After printing the image on the reverse surface of the $2^{nd}$ tabbed paper 702, the CPU 201 prints the image of the $6^{th}$ page on the $5^{th}$ tabbed paper 705.

Figure 7C:
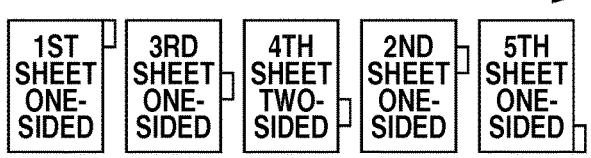

Therefore, in the output result, the $3^{rd}$ tabbed paper 703 is discharged next to the $1^{st}$ tabbed paper 701, the $4^{th}$ tabbed paper 704 is discharged next to the $3^{rd}$ tabbed paper 703, the $2^{nd}$ tabbed paper 702 is discharged next to the $4^{th}$ tabbed paper 704, and the $5^{th}$ tabbed paper 705 is discharged next to the $2^{nd}$ tabbed paper 702, respectively. The output result becomes as illustrated in FIG. 7C. As illustrated in FIG. 7C, the $2^{nd}$ tabbed paper 702 to be secondary discharged is actually discharged fourthly and the $3^{rd}$ tabbed paper 703 to be discharged thirdly and the $4^{th}$ tabbed paper 704, respectively, are discharged secondarily and thirdly. As described above, in the two-sided printing passing mode, when the job that must execute both of the one-sided printing and two-sided printing of the sheets of tabbed paper is executed, since shifting occurs between an order of feeding the sheets of tabbed paper and an order of printing the pages, there is a case that the sheets of tabbed paper are not discharged in the order the user desires.

As an example, the sheets of tabbed paper have been explained as the sheets having an order. However, a case where the printing is performed by using the pre-numbered sheets raises the same problem.

In the present exemplary embodiment, when the job for printing both of the sheets to be subjected to the one-sided printing and the sheets to be subjected to the two-sided printing is executed, the MFP 101 performs the control in the following manner to suppress the lowering of the productivity and output correct printed matters. An explanation is made as to the sheets of tabbed paper as the ordered sheets as an example. However, the present invention can be applied also to a case of using the pre-numbered sheets.

Figure 9:
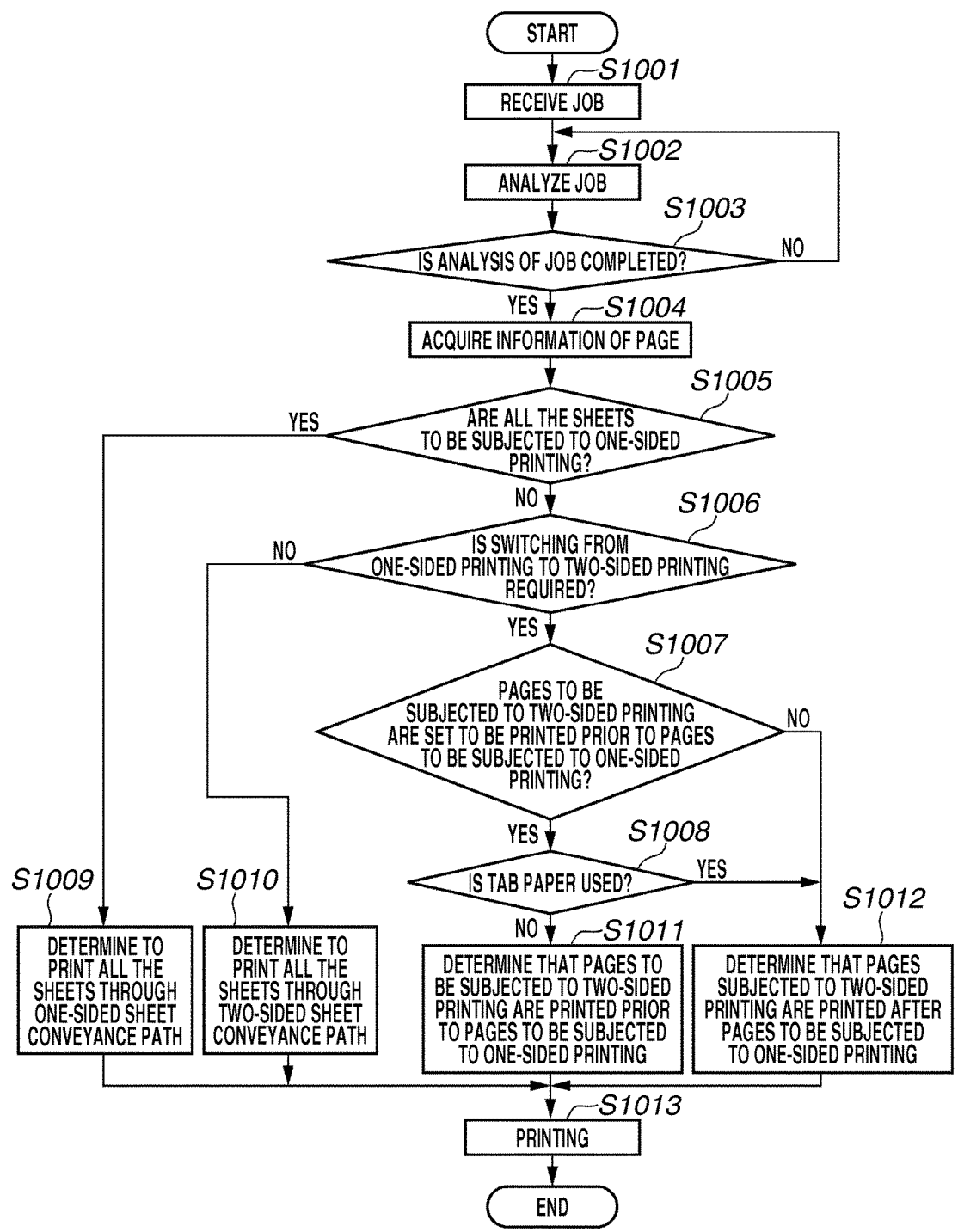
FIG. 9 is a flow chart illustrating a flow of processing according to the first exemplary embodiment.

FIG. 9 is a flow chart illustrating processing executed by the CPU 201 of the MFP 101 according to the present exemplary embodiment. Each of the steps illustrated in the flow chart of FIG. 9 is performed such that the CPU 201 reads out a program stored in the ROM 202 to execute it.

In step S1001, the CPU 201 receives the job from the PC 104 via the NIC unit 208 to store it in the memory unit 206. The job includes the print data (e.g., the PDL data) and the print settings for printing images based on the print data. The print settings include settings of the size or the sort of the sheets to be used in printing and the setting of the post-processing performed by the post-processing unit 212.

In step S1002, the CPU 201 analyzes the job stored in the memory unit 206. More specifically, the CPU 201 analyzes the print data contained in the job and identifies the size and the sort of the sheet on which the image of each of the pages included in the print data is to be printed. The CPU 201 reads out the print data stored in the memory unit 206 and develops thus read print data by using the image processing unit 204, thereby generating image data. The CPU 201 stores the generated image data in the memory unit 206.

In step S1003, the CPU 201 repeats the processing of step S1002 until the analysis of the received jobs is completed. Then, in a case where the analysis of the job is completed (YES in step S1003), the processing proceeds to step S1004.

In step S1004, the CPU 201 acquires information of each page. For example, the CPU 201 recognizes the page for which the one-sided printing is designated and the page for which printing is designated on a front surface of the sheet to be subjected to the two-sided printing or the page for which printing is designated on a reverse surface of the sheet to be subjected to the two-sided printing.

In step S1005, the CPU 201 determines whether or not all the sheets to be fed by the execution of the job is to be subjected to the one-sided printing based on the information acquired in step S1004. If all the pieces of image data are designated as being subjected to the one-sided printing (YES in step S1005), the CPU 201 determines all the sheets fed by the execution of the job is to be subjected to the one-sided printing. Then, the processing proceeds to step S1009. In step S1009, the CPU 201 determines that the image data of each page designated as being subjected to the one-sided printing is allocated to one of the sheets and thus all the sheets are subjected to the one-sided printing. In step S1013, the CPU 101 determines to feed sheets one by one from the paper feed unit 412, form the image on the fed sheet by the image forming unit 403, and discharge each sheet without guiding it to the two-sided conveyance path 408.

On the other hand, in step S1005, in a case where the pages designated to be subjected to the two-sided printing exist (NO in step S1005), the CPU 201 determines all the sheets are not to be subjected to the one-sided printing. Then, the processing proceeds to step S1006.

In step S1006, the CPU 201 determines whether or not switching from the one-sided printing to the two-sided printing is required with respect to the sheets fed by the execution of the job. If all the pieces of image data are designated to be subjected to the two-sided printing, the CPU 201 determines switching from the one-sided printing to the two-sided printing is not required with respect to the sheets fed by the execution of the job (NO in step S1006). Then, the processing proceeds to step S1010. In step S1010, the CPU 201 determines that the image data of each page designated to be subjected to the two-sided printing is allocated to each of the front surface and the reverse surface of the sheet in the right order and subjects all the sheets to the two-sided printing. In step S1013, the CPU 201 determines to feed the sheets one by one from the paper feed unit 412, form the image on the front surface of the fed sheet by the image forming unit 403, and discharge each sheet through the two-side conveyance path 408 after forming the image on the reverse surface thereof by the image forming unit 403. At the time, the CPU 201 may execute printing of the image data in the order of the pages or may execute printing in the order of the front surface of the $1^{st}$ page, the front surface of the $3^{rd}$ page, the front surface of the $5^{th}$ page, the reverse surface of the $2^{nd}$ page, the reverse surface of the $4^{th}$ page, and the reverse surface of the $6^{th}$ page in this order. In a case where the switching from the two-sided printing to the one-sided printing is required but the switching from the one-sided printing to the two-sided printing is not required (NO in step S1006), the processing proceeds from step S1006 to step S1010. In step S1010, the CPU 201 causes all the sheets fed by the execution of the job to be printed through the two-sided conveyance path 408. In this case, the CPU 201 may print the sheets with the allocated page which is subjected to the one-sided printing, following the last sheet to be subjected to the two-sided printing without conveying the sheet through the two-sided conveyance path 408.

On the other hand, in step S1006, in a case where the CPU 201 determines that the switching from the one-sided printing to the two-sided printing is required (YES in step S1006), the processing proceeds to step S1007.

In step S1007, the CPU 201 determines whether or not the setting is made such that the pages to be subjected to the two-sided printing are printed prior to the pages to be subjected to the one-sided printing. The setting may be preliminarily selected by the user as the setting of the MFP 101 or may be the setting of the job. The CPU 201 makes a determination in step S1007 based on either one of the above settings.

In step S1007, in a case where the setting is not made such that the pages to be subjected to the two-side printing are printed prior to the pages to be subjected to the one-sided printing (NO in step S1007), the processing proceeds to step S1012. In step S1012, the CPU 201 determines that the pages to be subjected to the two-sided printing are not printed prior to the pages to be subjected to the one-sided printing. In other words, the CPU 201 determines that the printing is to be performed in the order of pages of the image data as illustrated in FIG. 5.

On the other hand, in step S1007, in a case where the CPU 201 determines the setting is made such that the pages to be subjected to the two-sided printing are printed prior to the pages to be subjected to the one-sided printing (YES in step S1007), the processing proceeds to step S1008.

In step S1008, the CPU 201 determines whether or not the sheets of tabbed paper are fed by the execution of the job. In a case where the CPU 201 determines that the setting is made to use the sheets of tabbed paper in the print setting analyzed in step S1002 (YES in step S1008), the processing proceeds to step S1012. In a case where the CPU 201 determines that the setting is not made to use the sheets of tabbed paper in the print setting analyzed in step S1002 (NO in step S1008), the processing proceeds to step S1011. In a case where the setting of a sort of the sheets is not included in the print setting and information of the sort of the sheets is contained in the page information analyzed in step S1002, the CPU 201 may determine whether or not the sheets of tabbed paper are fed according to the execution of the job based on the page information.

In step S1011, the CPU 201 determines that the pages to be subjected to the two-sided printing are printed prior to the pages to be subjected to the one-sided printing. With respect to the sheets fed by the execution of the job using no tabbed paper, even if the pages to be subjected to the two-sided printing are printed prior to the pages to be subjected to the one-sided printing, a right output result can be made and thus the distance between the sheets can be narrowed. By narrowing the distance between the sheets, a time required for printing for the job can be reduced.

On the other hand, in step S1012, the CPU 201 determines that the pages to be subjected to the two-sided printing are not printed prior to the pages to be subjected to the one-sided printing. In other words, the CPU 201 determines that the image data are to be printed in the order of the pages as it is illustrated in FIG. 5. With respect to the sheets fed by the job using no tabbed paper, the pages to be subjected to the two-sided printing are not printed prior to the pages to be subjected to the one-sided printing, thereby preventing the output result unintended by the user from being output. The CPU 201 may determine that, instead of printing the pages in the order of the pages of the image data, all the pages are to be subjected to the two-sided printing in which the pages to be subjected to the one-sided printing are the front surfaces of the pages to be subjected to the two-sided printing and blank pages are added as the reverse surfaces of the pages corresponding to the front surfaces of the pages.

In step S1013, the CPU 201 feeds the sheets one by one and prints an image on the fed sheet according to the printing method determined in any one of the steps S1009 through S1012.

With the above described control, when the job for printing both of the sheets to be subjected to the one-sided printing and the sheets to be subjected to the two-sided printing is executed, degrading of the productivity can be suppressed and the correctly ordered printed matters can be output even in a case of using the ordered sheets such as the sheets of tabbed paper.

In a second exemplary embodiment, as illustrated in FIG. 8, the sheets of tabbed paper and the sheets of plain paper are included in the sheets fed by the execution of the job. Since the configurations of the system and the MFP 101 illustrated in FIGS. 1 through 4 are identical to those of the first exemplary embodiment, detailed descriptions thereof are omitted here.

In a case where the sheets of tabbed paper and the sheets of plain paper are included in the sheets fed by the execution of the job, even if the pages to be subjected to the two-sided printing are printed prior to the pages to be subjected to the one-sided printing, there is a case where a correct output result is output.

Figure 8A:
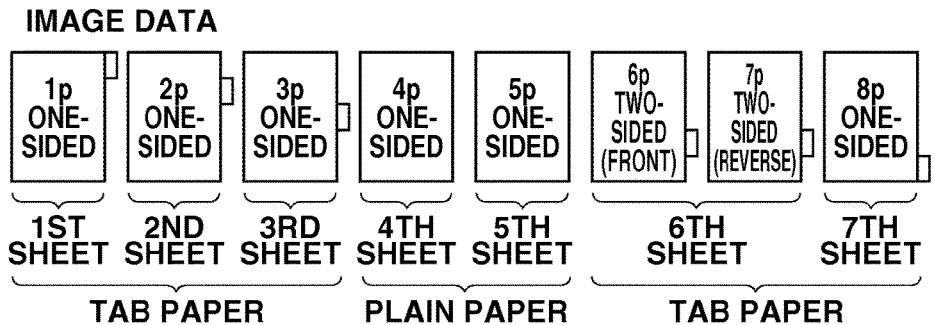
FIGS. 8A, 8B, and 8C, respectively, illustrate a state that a tabbed paper passes a precedent tabbed paper in a page order according to a second exemplary embodiment.

An example thereof is described below with reference to FIG. 8. In image data illustrated in FIG. 8A, the image of the $1^{st}$ page is the image for the $1^{st}$ tabbed paper, the image of the $2^{nd}$ page is the image for the $2^{nd}$ tabbed paper, and the image of the $3^{rd}$ page is the image for the $3^{rd}$ tabbed paper, respectively. Further, the image of the $4^{th}$ page is the image for the $4^{th}$ plain paper and the image of the $5^{th}$ page is the image for the $5^{th}$ plain paper, respectively. Still further, the image of the $6^{th}$ page is the image for the front surface of the $4^{th}$ tabbed paper, the image of the $7^{th}$ page is the image for the reverse surface of the $5^{th}$ tabbed paper, and the image of the $6^{th}$ page is the image for the $5^{th}$ tabbed paper, respectively.

Figure 8B:
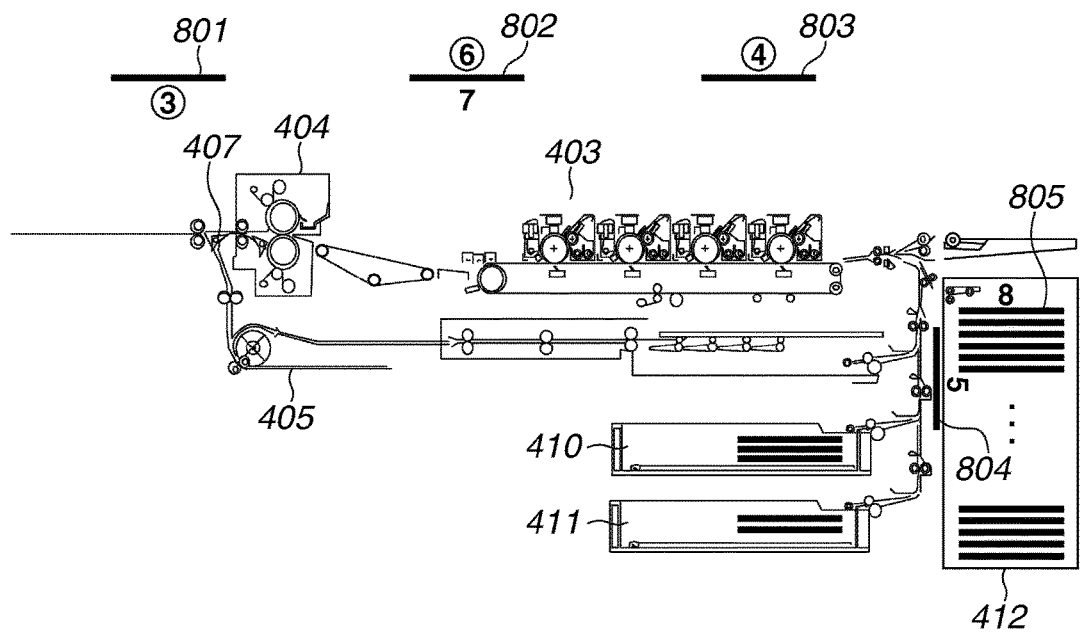
Figure 8C:
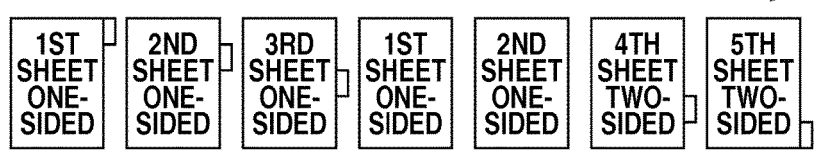

When the image data is printed in the two-sided printing passing mode, the image of the $1^{st}$ page is formed on the $1^{st}$ tabbed paper and the image of the $2^{nd}$ page is formed on the $2^{nd}$ tabbed paper. Each of the $1^{st}$ tabbed paper and the $2^{nd}$ tabbed paper is reversed in the reversing path 405 to be discharged. The image of the $3^{rd}$ page is formed on the $3^{rd}$ tabbed paper 801 and the $3^{rd}$ tabbed paper 801 is reversed through the reversing path 405 to be discharged. FIG. 8B illustrates a state of conveying the sheet at the time. At the time, the image of the $6^{th}$ page is formed on the front surface of the $4^{th}$ tabbed paper 802. The $4^{th}$ tabbed paper 802 is fed prior to the $1^{st}$ plain paper and the $2^{nd}$ plain paper and provided with the image printed thereon. After the image is printed on the front surface of the $4^{th}$ tabbed paper 802, the $4^{th}$ tabbed paper 802 is reversed through the reversing path 405 to be conveyed to the two-sided conveyance path 408. Following the $4^{th}$ tabbed paper 802, the $1^{st}$ plain paper 803 and the $2^{nd}$ plain paper 804 are fed to be printed, respectively, and are discharged after they are reversed through the reversing unit 405. After the $2^{nd}$ plain paper 804 is discharged to the image forming unit 403, the $4^{th}$ tabbed paper 802 conveyed to the two-sided conveyance path 408 is conveyed to the image forming unit 403 where the image is printed on the reverse surface of the $4^{th}$ tabbed paper 802. When the $4^{th}$ tabbed paper 802 is conveyed to the image forming unit 403 in order to form the image on the reverse surface of the $4^{th}$ tabbed paper 802, the $5^{th}$ tabbed paper 805 is fed and the image is printed on the $5^{th}$ tabbed paper 805. Then, the $5^{th}$ tabbed paper 805 is reversed through the reversing path 405 to be discharged. As a result thereof, the output result becomes as illustrated in FIG. 8C.

As described above, in a case of the job for printing the images on the tabbed paper and the plain paper, if the page of the front surface of the tabbed paper to be subjected to the two-sided printing is printed prior to the page of the plain paper to be subjected to the one-sided printing, the output result shows the right order. In this case, even if the page of the front surface of the tabbed paper to be subjected to the two-sided printing is previously printed in the two-sided printing passing mode, a correct output result can be made.

As described above, if the correct output result is output even when the job using the sheets of tabbed paper is executed, the pages to be subjected to the two-sided printing are printed prior to the pages to be subjected to the one-sided printing, which example is described with reference to FIG. 10.

Figure 10:
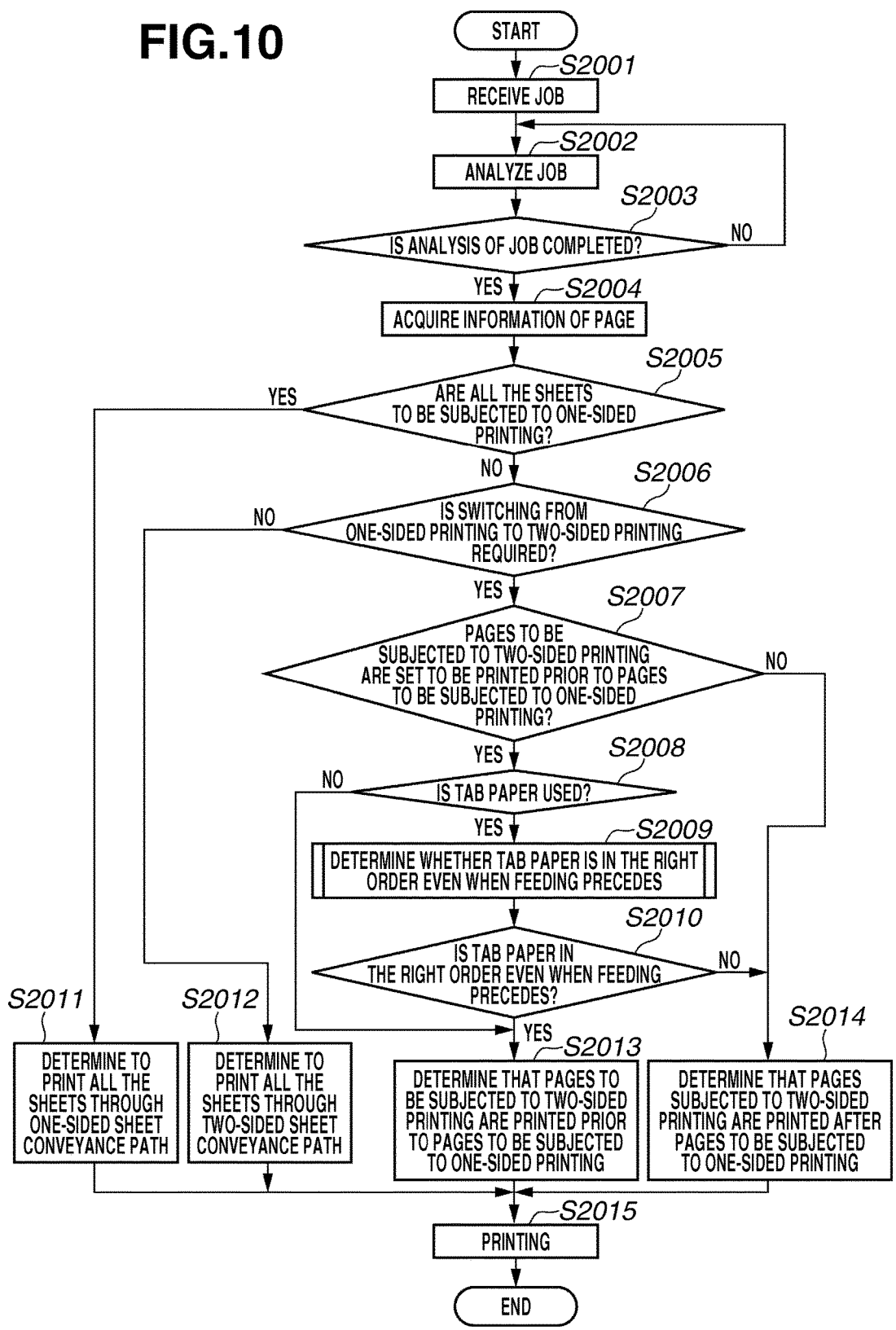
FIG. 10 is a flowchart illustrating the flow of the processing according to the second exemplary embodiment.

FIG. 10 is a flow chart illustrating processing according to the second exemplary embodiment. Each of the steps illustrated in the flow chart of FIG. 10 is performed such that the CPU 201 executes the program stored in the ROM 202. The processing illustrated in steps S2001 through S2008, S2011, and S2012 are identical to the processing illustrated in steps S1001 through S1008, S1009, and S1010 of FIG. 9 described in the first exemplary embodiment, so that detailed descriptions thereof are omitted here.

In step S2008, in a case where the CPU 201 determines the sheets of tabbed paper are not fed by the execution of the job (NO in step S2008), the processing proceeds to step S2013. In step S2013, the CPU 201 determines the pages to be subjected to the two-sided printing are to be printed prior to the pages to be subjected to the one-sided printing. With respect to the sheets to be fed by the execution of the job without using the sheets of tabbed paper, even if the pages to be subjected to the two-sided printing is printed prior to the sheets to be subjected to the one-sided printing, the correct output result can be made and thus the distance between the sheets can be narrowed. By narrowing the distance between the sheets, a time required for printing for the job can be reduced.

On the other hand, in step S2008, in a case where the CPU 201 determines the sheets of tabbed paper are fed by the execution of the job (YES in step S2008), the processing proceeds to step S2009.

In step S2009, the CPU 201 performs processing for determining whether or not the order of the sheets of tabbed paper can be kept even if the pages to be subjected to the two-sided printing are printed prior to the pages to be subjected to the one-sided printing. The processing in step S2009 is described below in detail with respect to FIG. 11.

As a result of the determination processing of step S2009, in step S2010, in a case where the CPU 201 determines that the order of the sheets of tabbed paper can be kept (YES in step S2010), the processing proceeds to step S2013. In step S2013, the CPU 201 determines the pages to be subjected to the two-sided printing are to be fed prior to the pages to be subjected to the one-sided printing.

On the other hand, in step S2010, in a case where the CPU 201 determines that the order of the sheets of tabbed paper cannot be kept (NO in step S2010), the processing proceeds to step S2014. In step S2014, the CPU 201 determines that the pages to be subjected to the two-sided printing are not to be printed prior to the pages to be subjected to the one-sided printing. In other words, the CPU 201 determines that the pages of the image data are to be printed in the order of the pages as illustrated in FIG. 5. With respect to the sheets to be fed by the execution of the job using the sheets of tabbed paper, the pages to be subjected to the two-sided printing are not printed prior to the sheets to be subjected to the one-sided printing, so that the output result unintended by the user can be prevented from being output. The CPU 201 may determine that instead of printing the pages according to the pages of the image data, all the pages are subjected to the two-sided printing in which the pages to be subjected to the one-side printing are the front surfaces of the pages to be subjected to the two-sided printing and that blank pages are added as the reverse surfaces of the pages corresponding to the front surfaces of the pages.

In step S2015, according to the printing method determined in any one of steps S2011 through S2014, the sheets are fed one by one and the image is printed on the sheet thus fed.

Figure 11:
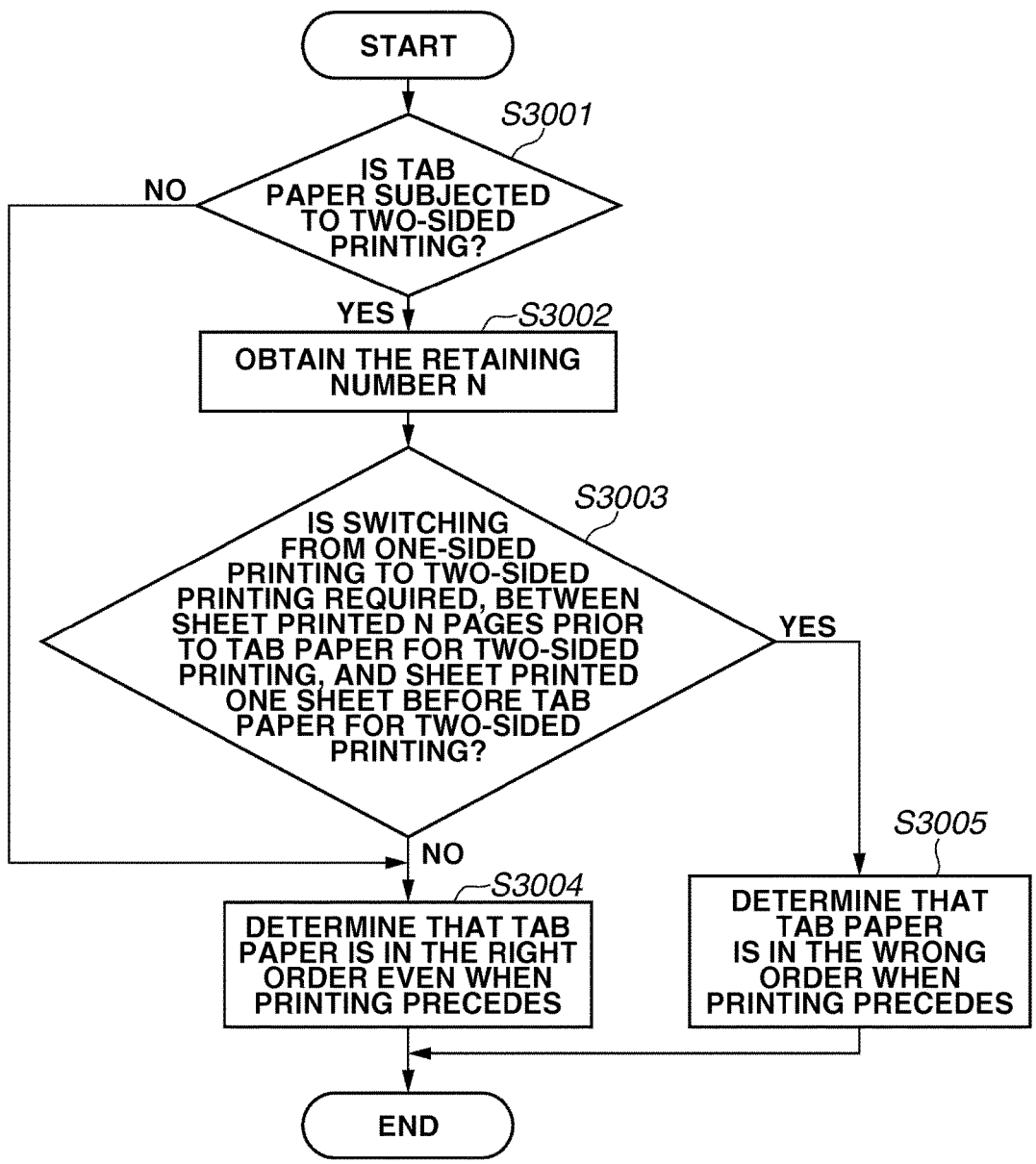
FIG. 11 is a flowchart illustrating the flow of the processing according to the second exemplary embodiment.

Now, processing of step S2009 of FIG. 10 is described below in detail with reference to FIG. 11.

In step S3001, the CPU 201 determines whether or not the sheets of tabbed paper to be used in step S2008 of FIG. 10 are to be subjected to the two-sided printing. In a case where the CPU 201 determines that the sheets of tabbed paper are to be subjected to the two-sided printing (YES in step S3001), the processing proceeds to step S3002, whereas, in a case where the CPU 201 determines the sheets of tabbed paper are to be subjected to the one-sided printing (NO in step S3001), the processing proceeds to step S3004. In step S3004, the CPU 201 determines that the sheets of tabbed paper are in the right order even if the pages to be subjected to the two-sided printing are printed prior to the pages to be subjected to the one-sided printing. Then, the processing proceeds to step S2010.

In step S3002, the CPU 201 acquires the retaining number N in the two-sided conveyance path 408 of the MFP 101. The retaining number means the number of sheets that can concurrently exist in the two-sided conveyance path 408 during the print processing.

In step S3003, the CPU 201 determines whether the switching from the one-sided printing to the two-sided printing is required between the sheet to be printed N sheets before tabbed paper to be subjected to the two-sided printing, and the sheet to be printed one sheet before tabbed paper to be subjected to the two-sided printing.

In step S3003, in a case where the CPU 201 determines the switching from the one-sided printing to the two-sided printing is not required (NO in step S3003), the processing proceeds to step S3004.

In step S3004, the CPU 201 determines that the order of the sheets of tabbed paper can be kept even if the pages to be subjected to the two-sided printing are printed prior to the pages to be subjected to the one-sided printing. Then, the processing proceeds to step S2013.

On the other hand, in step S3003, in a case where the CPU 201 determines that the switching from the one-sided printing to the two-sided printing is required (YES in step S3003), the processing proceeds to step S3005.

In step S3005, the CPU 201 determines that the order of the sheets of tabbed paper cannot be kept if the pages to be subjected to the two-sided printing are printed prior to the pages to be subjected to the one-sided printing. Then, the processing proceeds to step S2010.

The CPU 201 stores the determination result in step S3004 or step S3005 in the memory unit 206, thereby enabling the determination of step S2010 of FIG. 10.

With the above described control, in a case of execution of the job using the sheets of tabbed paper, if the correct output result is output even when the pages to be subjected to the two-sided printing are printed prior to the pages to be subjected to the one-sided printing, the printing can be achieved with the narrowed distance between the sheets. In a case where the CPU 201 determines that the correct output result is not output, since the pages to be subjected to the two-sided printing are not printed prior to the pages to be subjected to the one-sided printing and the printing is performed according to the order of the pages of the image data, the correct output result can be obtained.

In the above described exemplary embodiment, an example is described in which the sheet feeding method is determined to start printing, upon receiving the print job, after the analysis of the received job is completed.

In a third exemplary embodiment, an example is described in which the CPU 201 starts printing upon receiving the print job without waiting for the completion of the analysis of the received job. The configurations of the system and the MFP 101 illustrated in FIGS. 1 through 4 are identical to those described in the first exemplary embodiment, so that the detailed descriptions thereof are omitted here.

Figure 13B:
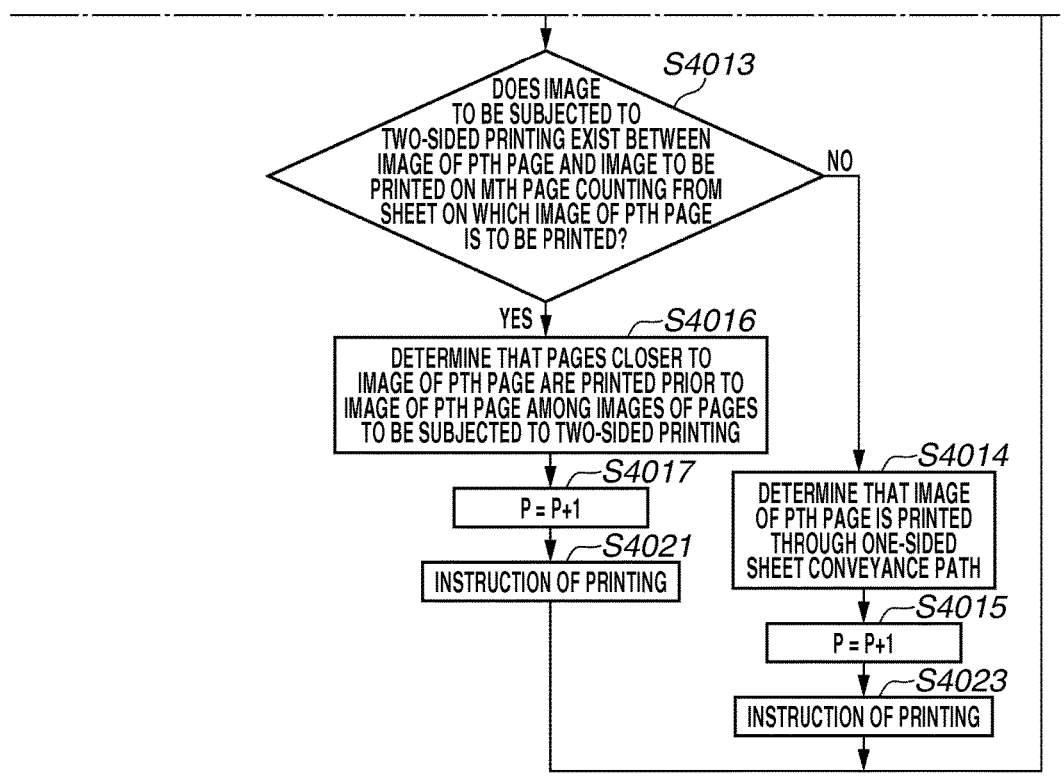

FIGS. 12 and 13 are a flow chart illustrating processing according to the present exemplary embodiment. Each of the steps of the flow charts of FIGS. 12 and 13 is performed such that the CPU 201 reads out different programs within the ROM 202 to execute them. In the present exemplary embodiment, a single CPU 201 executes the different programs to perform the processing illustrated in the flow chart of FIG. 12 and the processing illustrated in the flow chart of FIG. 13 as an example. However, each of the processing may be executed by different CPUs.

In step S5001, the CPU 201 receives the job from the PC 104 via the NIC unit 208 to store it in the memory unit 206. The job includes print data (e.g., PDL data) and a print setting for printing an image based on the print data. The print setting includes a size or a sort of the sheets to be used in printing and a setting of the post-processing performed by the post-processing unit 212.

In step S5002, the CPU 201 analyzes job information of the job stored in the memory unit 206. More specifically, the CPU 201 analyzes the print setting included in the job.

In step S5003, the CPU 201 determines whether or not the sheets of tabbed paper are to be used in the job based on the information of the analyzed print setting.

In step S5004, the CPU 201 stores a fact that the job uses the sheets of tabbed paper in the memory unit 206.

In step S5005, the CPU 201 develops each of the pages included in the job by using the image processing unit 204 to generate image data.

In step S5006, the CPU 201 determines whether or not the development for a single page is completed. The processing of step S5005 is repeated until the development of the image for the single page is completed. When the development of the image for the single page is completed (YES in step S5006), the processing proceeds to step S5007.

In step S5007, the CPU 201 stores the image data after the completion of the development thereof in a print queue.

In step S5008, the CPU 201 determines whether or not the development is completed with respect to all the pages. In a case where the CPU 201 determines the development is completed with respect to all the pages (YES in step S5008), the processing proceeds to step S5009. In a case where the CPU 201 determines the development is not completed with respect to all the pages (NO in step S5008), the processing returns to step S5005. Then, the CPU 201 starts developing the next page.

In step S5009, the CPU 201 stores an end of the job in the memory unit 206.

Processing illustrated in a flow chart of FIG. 13 is executed by the CPU 201 concurrently with the processing illustrated in the flow chart of FIG. 12.

In step S4001, the CPU 201 determines whether or not the image data stored in the print queue exists. In a case where the CPU 201 determines the image data stored in the print queue exists (YES in step S4001), the processing proceeds to step S4002.

In step S4002, the CPU 201 determines whether or not the job uses the sheets of tabbed paper. In step S5004, this determination is performed based on information related to the information of the job and stored in the memory unit 206.

In a case where the CPU 201 determines the job uses the sheets of tabbed paper (NO in step S4002), the processing proceeds to step S4003.

In and after step S4003, the CPU 201 performs control such that the pages to be subjected to the two-sided printing and included in the job are printed prior to the pages to be subjected to the one-sided printing.

In step S4004, the CPU 201 initializes P to 1 and M to 0. The CPU 201 determines the sheet feeding method for the sheets on which the images are to be printed while the CPU 201 increments a value of P.

In step S4005, the CPU 201 determines whether or not there is an image of $P^{th}$ page in the print queue.

In step S4006, the CPU 201 determines whether or not the development of the image to be printed on the sheet N pages ahead based on the sheet on which the image of the $P^{th}$ page is printed, is completed.

In a case where the CPU 201 determines that the development of the image to be printed on the sheet N pages ahead is completed (YES in step S4006), in step S4007, the CPU 201 substitutes N into M.

In a case where the CPU 201 determines that the development of the image to be printed on the sheet N pages ahead is not completed (NO in step S4006), in step S4008, the CPU 201 substitutes, into M, the number of sheets before being fed among the sheets on which the data of the page having been developed is printed.

In step S4009, the CPU 201 acquires information of the image from the image of the $P^{th}$ page to the image to be printed on the $M^{th}$ sheet counted from the sheet on which the image of the $P^{th}$ page is to be printed.

In step S4010, in a case where the CPU 201 determines the image of the $P^{th}$ page is not to be subjected to the one-sided printing (NO in step S4010), in step S4011, the CPU 201 determines that the sheet on which the image of the $P^{th}$ page and the image of the $P+1^{th}$ page are to be printed is to be printed through the two-sided conveyance path 408. In step S4012, the CPU 201 adds 2 to P and the processing proceeds to step S4022. In step S4022, the CPU 201 instructs the image forming unit 210 to print the image of the $P^{th}$ page and the image of the $P+1^{th}$ page. Then, the processing returns to step S4005.

In step S4010, in a case where the CPU 201 determines that the image of the $P^{th}$ page is the image to be subjected to the one-sided printing (Yes in step S4010), the processing proceeds to step S4013.

In step S4013, the CPU 201 determines whether or not there exists the image to be subjected to the two-sided printing between the image of $P^{th}$ page and the image to be printed on the $M^{th}$ sheet counting from the sheet on which the image of the $P^{th}$ page is to be printed.

In a case where the CPU 201 determines such an image does not exist (NO in step S4013), the processing proceeds to step S4014.

In step S4014, the CPU 201 determines that the image of the $P^{th}$ page is printed through the one-sided conveyance path. In step S4015, the CPU 201 adds 1 to P. Then, the processing proceeds to step S4023. In step S4023, the CPU 201 instructs the image forming unit 210 to print the image of the $P^{th}$ page. The processing returns to step S4005.

On the other hand, in step S4013, in a case where the CPU 201 determines that there is the image to be subjected to the two-sided printing between the image of the $P^{th}$ page and the image to be printed on the $M^{th}$ sheet counting from the sheet on which the image of the $P^{th}$ page is to be printed (YES in step S4013), the processing proceeds to step S4016.

In step S4016, the CPU 201 determines in order whether or not the page is to be subjected to the two-sided printing starting from the page closest to the image of the $P^{th}$ page. In a case where the CPU 201 determines that the page is to be subjected to the two-sided printing, the CPU 201 determines that the image of the page is to be printed prior to the image of the $P^{th}$ page. The processing proceeds to step S4021 where the CPU 201 instructs the image forming unit 210 to perform the printing. Then, the processing returns to step S4005.

In step S4017, the CPU 201 adds 1 to P. Then, the processing returns to step S4005.

In step S4005, in a case where the CPU 201 determines that the image of the $P^{th}$ page does not exist (NO in step S4005) and, in step S4019, that the end of the job is notified (YES in step S4019), the processing is ended.

As described above, in a case where the job does not use the sheets of tabbed paper, the MFP 101 is operated in the passing mode as illustrated in FIG. 6, which can suppress lowering of the productivity.

On the other hand, in step S4002, in a case where the CPU 201 determines the job uses the sheets of tabbed paper (YES in step S4002), the processing proceeds to step S4018. In step S4018, the CPU 201 determines to print the images according to the order of the pages. Namely, in step S4018, the CPU 201 determines that the images to be subjected to the two-sided printing are formed by the image forming unit 403 in the order of the pages of the image data without printing them prior to the images to be subjected to the one-sided printing.

In step S4020, the CPU 201 instructs the image forming unit 210 to carry out the printing.

With the above control, even in a case where the printing is started without waiting for the completion of the analysis of the received job, the lowering of the productivity can be suppressed when executing the job for printing both of the sheets to be subjected to the one-sided printing and the sheets to be subjected to the two-sided printing. Further, in a case of using the ordered sheets such as the sheets of tabbed paper, correctly ordered printed matter can be output.

In the above described first exemplary embodiment through the third exemplary embodiment, the respective processing may be selectively executed by the MFP 101. For example, in the setting of the MFP 101, in a case where the setting is made such that the processing illustrated in FIG. 9 according to the first exemplary embodiment is executed, the CPU 201 executes the processing illustrated in FIG. 9. Further, in the setting of the MFP 101, in a case where the setting is made such that the processing illustrated in FIG. 10 according to the second exemplary embodiment is executed, the CPU 201 executes the processing illustrated in FIG. 10. Furthermore, in the setting of the MFP 101, in a case where the setting is made such that the processing illustrated in FIGS. 12 and 13 according to the third exemplary embodiment are executed, the CPU 201 executes the processing illustrated in FIGS. 12 and 13.

The function illustrated in the flow chart according to the present exemplary embodiment can be also realized such that the software (program) acquired via the network or various storage media is executed by a processing apparatus (e.g., a CPU and a processor) such as a personal computer.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An image forming apparatus comprising:
    a printing unit configured to print image data on a sheet;
    a sheet feeding unit configured to feed the sheet from a sheet storage unit to the printing unit;
    a sheet re-feeding unit configured to be operable when two-sided printing is to be performed, to re-feed the sheet, printed on a front side of the sheet, toward the printing unit so as to print another image data on a back side of the sheet;
    a receiving unit configured to receive a print job for printing a first page of image data on a front side of a first sheet, printing a second page of image data on a front side of a second sheet, and printing a third page of image data on a back side of the second sheet; and
    a control unit configured to:
    specify a type of sheets that are to be used for the first and second sheets,
    control, in a case where the type of sheets is specified as pre-numbered sheets, the printing unit to print on the first and second sheets in the following order:
    firstly, the first page of image data is printed on the front side of the first sheet fed by the sheet feeding unit,
    secondly, the second page of image data is printed on the front side of the second sheet fed by the sheet feeding unit, and
    thirdly, the third page of image data is printed on the back side of the second sheet re-fed by the re-feeding unit, and
    control, in a case where the type of sheets is not specified as pre-numbered sheets, the printing unit to print on the first and second sheets in the following order:
    firstly, the second page of image data is printed on the front side of the second sheet fed by the sheet feeding unit,
    secondly, the first page of image data is printed on the front side of the first sheet fed by the sheet feeding unit, the first sheet being not re-fed by the re-feeding unit, and
    thirdly, the third page of image data is printed on the back side of the second sheet re-fed by the re-feeding unit.

2. The image forming apparatus according to claim 1, further comprising a two-sided conveyance path,
    wherein the second sheet printed on the first side of the sheet is re-fed through the two-sided conveyance path.

3. The image forming apparatus according to claim 2, wherein the first sheet is discharged without passing thorough the two-sided conveyance path.

4. The image forming apparatus according to claim 1, wherein the control unit analyzes the plurality of pages and determines whether each page is a page for one-sided printing or for two-sided printing.

5. The image forming apparatus according to claim 1, wherein the control unit specifies the type of the first and second sheets by analyzing the first page and the second page of image data.

6. The image forming apparatus according to claim 1, wherein the plurality of pages of image data is Page Description Language (PDL) data.

7. The image forming apparatus according to claim 1, wherein the pre-numbered sheets have a predetermined order.

* * * * *